US012615063B2

(12) United States Patent
Tahara et al.

(10) Patent No.:  US 12,615,063 B2
(45) Date of Patent:      Apr. 28, 2026

(54) HIGH FREQUENCY CIRCUIT AND COMMUNICATION APPARATUS

(71) Applicant: Murata Manufacturing Co., Ltd., Kyoto (JP)

(72) Inventors: Kenji Tahara, Kyoto (JP); Takanori Uejima, Kyoto (JP); Hiroyuki Nagamori, Kyoto (JP); Takahiro Katamata, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 332 days.

(21) Appl. No.: 18/495,099

(22) Filed: Oct. 26, 2023

(65) Prior Publication Data

US 2024/0056108 A1      Feb. 15, 2024

Related U.S. Application Data

(63) Continuation of application No. PCT/JP2022/017326, filed on Apr. 8, 2022.

(30) Foreign Application Priority Data

May 18, 2021      (JP) ................................. 2021-083999

(51) Int. Cl.
*H04B 1/00*          (2006.01)
*H04B 1/04*          (2006.01)
*H04B 1/40*          (2015.01)
(52) U.S. Cl.
CPC ........... *H04B 1/0057* (2013.01); *H04B 1/006* (2013.01)

(58) Field of Classification Search
None
See application file for complete search history.

(56) References Cited

U.S. PATENT DOCUMENTS

| | | | |
|---|---|---|---|
| 6,697,605 B1 | 2/2004 | Atokawa et al. | |
| 7,570,622 B2 * | 8/2009 | Totsuka ................... | H04B 1/48 455/132 |
| 8,130,787 B2 * | 3/2012 | Hagiwara ................ | H04B 1/48 370/463 |

(Continued)

FOREIGN PATENT DOCUMENTS

| | | |
|---|---|---|
| JP | 2000-353976 A | 12/2000 |
| JP | 2019-154025 A | 9/2019 |

(Continued)

OTHER PUBLICATIONS

International Search Report for PCT/JP2022/017326 dated Jul. 12, 2022.

*Primary Examiner* — Pablo N Tran
(74) *Attorney, Agent, or Firm* — McDonald Hopkins LLC

(57)      ABSTRACT

A high frequency circuit includes a switch that includes terminals; a switch that includes terminals; a filter that has a pass band including a first band; and a diplexer that includes terminals. The diplexer includes a filter that is connected between the terminals and has a pass band including a first frequency band group containing the first band and a filter that is connected between the terminals and has a pass band including a second frequency band group. The terminal is connected to an antenna terminal. The terminals are connected to one terminal of the filter. The terminal is connected to the terminal. The terminal is connected to the terminal.

12 Claims, 11 Drawing Sheets

(56) References Cited

U.S. PATENT DOCUMENTS

| | | | | |
|---|---|---|---|---|
| 9,866,261 | B2 * | 1/2018 | Laurila | H04B 1/44 |
| 10,129,008 | B2 * | 11/2018 | Ebihara | H04L 5/1461 |
| 11,159,147 | B2 * | 10/2021 | Jo | H03H 11/28 |
| 2019/0273519 | A1 | 9/2019 | Shinozaki et al. | |
| 2019/0356344 | A1 | 11/2019 | Takada | |

FOREIGN PATENT DOCUMENTS

| | | | |
|---|---|---|---|
| JP | 2019-205007 | A | 11/2019 |
| KR | 1020190104874 | A | 9/2019 |

* cited by examiner

FIRST BAND/SECOND BAND
SIMULTANEOUS TRANSMISSION

HIGH FREQUENCY CIRCUIT

FIG. 4

FIRST BAND TRANSMISSION

HIGH FREQUENCY CIRCUIT

FIG. 7

HIGH FREQUENCY CIRCUIT AND COMMUNICATION APPARATUS

CROSS REFERENCE TO RELATED APPLICATION

This is a continuation of International Application No. PCT/JP2022/017326 filed on Apr. 8, 2022 which claims priority from Japanese Patent Application No. 2021-083999 filed on May 18, 2021. The contents of these applications are incorporated herein by reference in their entireties.

BACKGROUND OF THE DISCLOSURE

Field of the Disclosure

The present disclosure relates to a high frequency circuit and a communication apparatus.

Description of the Related Art

In Patent Document 1, a high frequency circuit used for wireless communication using multiple bands including frequency bands of 3 GHz or higher frequencies is disclosed. A multiplexer including a filter that uses a frequency band (UH band) belonging to 3 GHz or higher frequencies as a pass band and a filter that uses a frequency band (MH band) belonging to 3 GHz or lower frequencies as a pass band is disposed between an antenna and a front end circuit. With this arrangement, a high frequency circuit supporting multiple bands and capable of performing the transfer of high frequency signals of a plurality of bands, which includes both simultaneous transfer of signals of the UH band and the MH band and independent transfer of a signal of the UH band or the MH band, can be achieved.

Patent Document 1: Japanese Unexamined Patent Application Publication No. 2019-205007

BRIEF SUMMARY OF THE DISCLOSURE

However, in the high frequency circuit disclosed in Patent Document 1, even in the case where only a signal of one of a plurality of frequency bands (for example, the UH band and the MH band) is transferred in a single mode, since the signal passes through the multiplexer, signal transfer loss may increase.

Accordingly, the present disclosure provides a high frequency circuit and a communication apparatus supporting multiple bands and capable of transferring a signal in a single mode with low loss.

A high frequency circuit according to an aspect of the present disclosure includes a first antenna terminal; a first switch circuit that includes a first terminal, a second terminal, and a third terminal; a second switch circuit that includes a fourth terminal and a fifth terminal; a first filter that has a pass band including a first band; and a first multiplexer that includes a first common terminal, a sixth terminal, and a seventh terminal. The first multiplexer includes a second filter that is connected between the first common terminal and the sixth terminal and has a pass band including a first frequency band group containing the first band but not including a second frequency band group and a third filter that is connected between the first common terminal and the seventh terminal and has a pass band including the second frequency band group but not including the first frequency band group. The first terminal is connected to the first antenna terminal. The second terminal and the fourth terminal are connected to one terminal of the first filter. The third terminal is connected to the first common terminal. The fifth terminal is connected to the sixth terminal.

According to the present disclosure, a high frequency circuit and a communication apparatus supporting multiple bands and capable of transferring a signal in a single mode with low loss can be provided.

BRIEF DESCRIPTION OF THE SEVERAL VIEWS OF THE DRAWINGS

FIG. 4 is a diagram illustrating the state of the circuit at the time when independent transmission using the first band is performed in the high frequency circuit according to the embodiment.

FIG. 7 is a diagram illustrating the state of the circuit at the time when independent transmission using the second band is performed in the high frequency circuit according to Modification 1.

DETAILED DESCRIPTION OF THE DISCLOSURE

Figure 1:
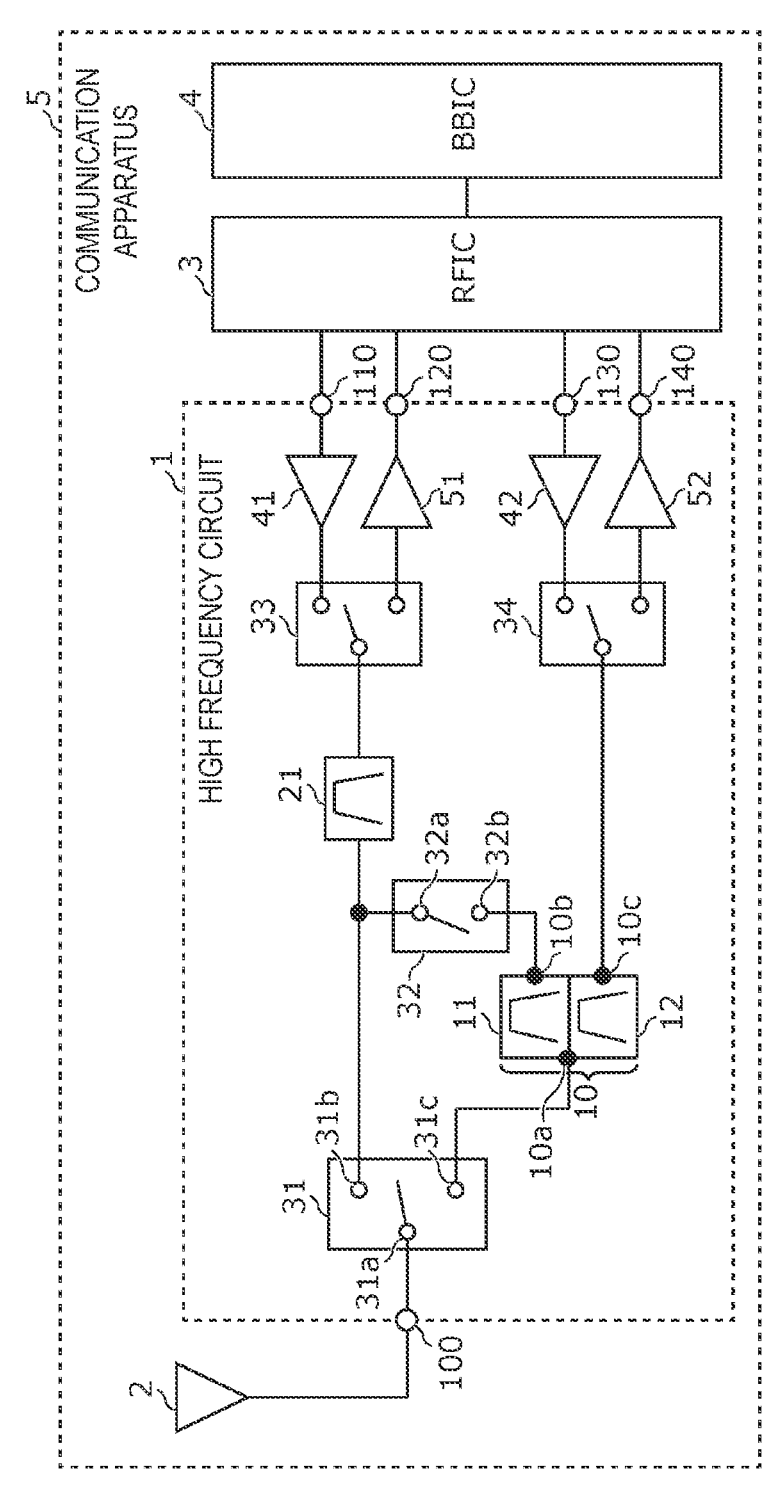
FIG. 1 is a circuit configuration diagram of a high frequency circuit and a communication apparatus according to an embodiment.

The details of the embodiments of the present disclosure will be described below with reference to the drawings. The embodiments described below each illustrate a comprehensive or specific example. The numerical values, shapes, materials, component elements, arrangements of the component elements, manners in which the component elements are connected, and so on illustrated in the embodiments described below are merely examples and are not intended to limit the present disclosure.

The drawings are schematic diagrams in which emphasis, omission, or ratio adjustment is performed in an appropriate manner in order that the present disclosure is illustrated. The drawings are not necessarily strictly illustrated and may differ from actual shapes, positional relationships, and ratios. In the drawings, substantially the same configurations are denoted by the same reference signs, and repetitive description may be omitted or simplified.

In the present disclosure, "being connected" not only represents being directly connected by a connection terminal and/or a wire conductor but also includes being electrically connected with another circuit element interposed therebetween. Furthermore, "being connected to a part between A and B" and "being connected between A and B" each represent being connected to both A and B on a path connecting A with B.

Furthermore, in this disclosure, a "transmission path" represents a transfer line including a wire through which a high frequency transmission signal propagates, an electrode directly connected to the wire, a terminal directly connected to the wire or the electrode, and the like. Furthermore, a "reception path" represents a transfer line including a wire through which a high frequency reception signal propagates, an electrode directly connected to the wire, a terminal directly connected to the wire or the electrode, and the like.

EMBODIMENTS

1. Circuit Configurations of High Frequency Circuit 1 and Communication Apparatus 5

Circuit configurations of a high frequency circuit 1 and a communication apparatus 5 according to an embodiment will be described with reference to FIG. 1. FIG. 1 is a circuit configuration diagram of the high frequency circuit 1 and the communication apparatus 5 according to an embodiment.

[1.1 Circuit Configuration of Communication Apparatus 5]

First, the circuit configuration of the communication apparatus 5 will be described. As illustrated in FIG. 1, the communication apparatus 5 according to this embodiment includes the high frequency circuit 1, an antenna 2, an RF signal processing circuit (RFIC) 3, and a baseband signal processing circuit (BBIC) 4.

The high frequency circuit 1 transfers high frequency signals between the antenna 2 and the RFIC 3. The detailed circuit configuration of the high frequency circuit 1 will be described later.

The antenna 2 is connected to an antenna terminal 100 of the high frequency circuit 1 and transmits a high frequency signal outputted from the high frequency circuit 1. The antenna 2 also receives a high frequency signal from the outside and outputs the received high frequency signal to the high frequency circuit 1.

The RFIC 3 is an example of a signal processing circuit that processes high frequency signals. Specifically, the RFIC 3 performs signal processing such as down-conversion for a reception signal inputted through a reception path of the high frequency circuit 1, and outputs the reception signal generated by the signal processing to the BBIC 4. The RFIC 3 also performs signal processing such as up-conversion for a transmission signal inputted from the BBIC 4, and outputs the transmission signal generated by the signal processing to a transmission path of the high frequency circuit 1. Furthermore, the RFIC 3 also includes a controller that controls a switch, an amplifier, and other elements included in the high frequency circuit 1. Part of or all the functions of the RFIC 3 as a controller may be implemented outside the RFIC 3 and, for example, may be implemented on the BBIC 4 or the high frequency circuit 1.

The BBIC 4 is a baseband signal processing circuit that performs signal processing using an intermediate frequency band that is lower than the frequency of a high frequency signal transferred from the high frequency circuit 1. For example, image signals for image display and/or audio signals for conversion via a speaker are used as signals processed by the BBIC 4.

The antenna 2 and the BBIC 4 are not essential component elements in the communication apparatus 5 according to this embodiment.

[1.2 Circuit Configuration of High Frequency Circuit 1]

Next, the circuit configuration of the high frequency circuit 1 will be described. As illustrated in FIG. 1, the high frequency circuit 1 includes a diplexer 10, a filter 21, switches 31, 32, 33, and 34, power amplifiers 41 and 42, low noise amplifiers 51 and 52, the antenna terminal 100, transmission input terminals 110 and 130, and reception output terminals 120 and 140.

The antenna terminal 100 is an example of a first antenna terminal and is connected to the antenna 2.

The diplexer 10 is an example of a first multiplexer and includes terminals 10a (first common terminal), 10b (sixth terminal), and 10c (seventh terminal) and filters 11 and 12. The filter 11 is an example of a second filter and is a filter that is connected between the terminals 10a and 10b and has a pass band including a first frequency band group containing a first band but not including a second frequency band group. The filter 12 is an example of a third filter and is a filter that is connected between the terminals 10a and 10c and has a pass band including the second frequency band group but not including the first frequency band group, where frequencies in the second frequency band group and frequencies in the first frequency band group do not overlap.

The first multiplexer is not limited to a diplexer and may be a multiplexer that demultiplexes and/or multiplexes three or more frequency band groups.

The filter 21 is an example of a first filter and has a pass band including the first band belonging to the first frequency band group. The first band is a band for time division duplex (TDD). Thus, both a transmission signal and a reception signal of the first band pass through the filter 21. In the case where the first band is a band for frequency division duplex (FDD), instead of the filter 21, a duplexer that includes a transmission filter having an uplink operation band as a pass band and a reception filter having a downlink operation band as a pass band may be arranged.

In this embodiment, the first band and second to sixth bands, which will be described later, represent frequency bands defined in advance by standards organizations or other bodies (for example, 3GPP (registered trademark) (3rd Generation Partnership Project), IEEE (Institute of Electrical and Electronics Engineers), and the like) for communication systems established using radio access technology (RAT). In this embodiment, for example, a 4G (4th Generation)-LTE (Long Term Evolution) system, a 5G (5th Generation)-NR (New Radio) system, a WLAN (Wireless Local Area Network) system, and the like may be used as communication systems. However, the communication systems are not limited to those mentioned above.

The power amplifier 41 is capable of amplifying a transmission signal of the first band inputted from the RFIC 3. The power amplifier 41 is connected between the transmission input terminal 110 and the switch 33.

The low noise amplifier 51 is capable of amplifying a reception signal of the first band inputted from the antenna 2. The low noise amplifier 51 is connected between the reception output terminal 120 and the switch 33.

The power amplifier 42 is capable of amplifying a transmission signal of the second band belonging to the second frequency band group inputted from the RFIC 3. The power amplifier 42 is connected between the transmission input terminal 130 and the switch 34.

The low noise amplifier 52 is capable of amplifying a reception signal of the second band inputted from the antenna 2. The low noise amplifier 52 is connected between the reception output terminal 140 and the switch 34.

The switch 31 is an example of a first switch circuit. The switch 31 includes terminals 31a (first terminal), 31b (second terminal), and 31c (third terminal) and switches between connection between the terminal 31a and the terminal 31b and connection between the terminal 31a and the terminal 31c. The terminal 31a is connected to the antenna terminal 100, the terminal 31b is connected to one terminal of the filter 21, and the terminal 31c is connected to the terminal 10a.

The switch 32 is an example of a second switch circuit. The switch 32 includes terminals 32a (fourth terminal) and 32b (fifth terminal) and switches between connection and disconnection between the terminal 32a and the terminal 32b. The terminal 32a is connected to the terminal 31b and the one terminal of the filter 21, and the terminal 32b is connected to the terminal 10b.

The switch 33 is an example of a so-called TDD switch and switches between connection between the other terminal of the filter 21 and an output terminal of the power amplifier 41 and connection between the other terminal of the filter 21 and an input terminal of the low noise amplifier 51.

The switch 34 is an example of a so-called TDD switch and switches between connection between the terminal 10c and an output terminal of the power amplifier 42 and connection between the terminal 10c and an input terminal of the low noise amplifier 52.

In this embodiment, for example, a high band (HB), a mid-high band (MHB), a low band (LB), and the like including frequencies of 3 GHz or less are used as the first frequency band group. Furthermore, for example, band B1 (transmission band: 1920 MHz to 1980 MHz, reception band: 2110 MHz to 2170 MHz), B3 (transmission band: 1710 MHz to 1785 MHz, reception band: 1805 MHz to 1880 MHz), B5 (transmission band: 824 MHz to 849 MHz, reception band: 869 MHz to 894 MHz), B7 (transmission band: 2500 MHz to 2570 MHz, reception band: 2620 MHz to 2690 MHz), B26 (transmission band: 814 MHz to 849 MHz, reception band: 859 MHz to 894 MHz), B41 (band: 2496 MHz to 2690 MHz), and the like for 4G-LTE are used as the first band. Furthermore, for example, an ultra-high band (UHB) and other bands including frequencies of 3 GHz or more are used as the second frequency band group. Furthermore, for example, band n77 (band: 3300 MHz to 4200 MHz), n79 (band: 4400 MHz to 5000 MHz), and the like for 5G-NR are used as the second band.

With the configurations of the high frequency circuit 1 and the communication apparatus 5 described above, in the case where simultaneous transfer of a signal of the first frequency band group and a signal of the second frequency band group is performed, by causing both the signals to pass through the diplexer 10, isolation between the signals can be ensured. Furthermore, in the case where independent transfer of a signal of the first frequency band group is performed (single mode), by causing the signal not to pass through the diplexer 10, transfer loss of the signal can be reduced. That is, the high frequency circuit 1 and the communication apparatus 5 supporting multiple bands and capable of transferring a signal in the single mode with low loss can be provided.

In the case where only the second band belongs to the second frequency band group and a signal of the second band is transferred using TDD in the high frequency circuit 1, no filter needs to be provided between the diplexer 10 and the switch 34. Thus, reduction of the size of the high frequency circuit 1 can be achieved.

The high frequency circuit 1 according to this embodiment does not necessarily include the power amplifiers 41 and 42, the low noise amplifiers 51 and 52, the switches 33 and 34, the transmission input terminals 110 and 130, and the reception output terminals 120 and 140.

[1.3 Circuit Configuration of High Frequency Circuit According to Comparative Example 1]

Figure 2:
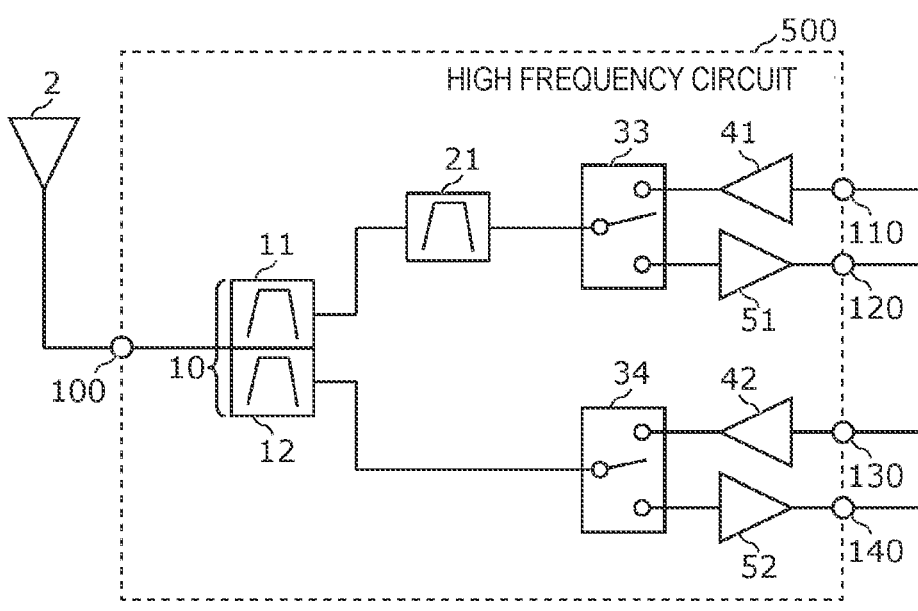
FIG. 2 is a circuit configuration diagram of a high frequency circuit according to Comparative Example 1.

The circuit configuration of Comparative Example 1 corresponding to a conventional art will now be described. FIG. 2 is a circuit configuration diagram of a high frequency circuit 500 according to Comparative Example 1. The high frequency circuit 500 includes the diplexer 10, the filter 21, the switches 33 and 34, the power amplifiers 41 and 42, the low noise amplifiers 51 and 52, the antenna terminal 100, the transmission input terminals 110 and 130, and the reception output terminals 120 and 140. The high frequency circuit 500 according to Comparative Example 1 is different from the high frequency circuit 1 according to the embodiment in that the switches 31 and 32 are not arranged. Regarding the high frequency circuit 500 according to Comparative Example 1, description of the same configurations as those of the high frequency circuit 1 according to the embodiment will be omitted, and differences will be mainly described.

The diplexer 10 includes the terminals 10a (first common terminal), 10b (sixth terminal), and 10c (seventh terminal) and the filters 11 and 12. The filter 11 is a filter that is connected between the terminal 10a and the terminal 10b and has a pass band including the first frequency band group containing the first band. The filter 12 is a filter that is connected between the terminals 10a and 10c and has a pass band including the second frequency band group, where frequencies in the second frequency band group and frequencies in the first frequency band group do not overlap.

The filter 21 has a pass band including the first band belonging to the first frequency band group.

The terminal 10a is connected to the antenna terminal 100, the terminal 10b is connected to the one terminal of the filter 21, and the terminal 10c is connected to the switch 34.

With the configuration of the high frequency circuit 500 according to Comparative Example 1 described above, in the case where simultaneous transfer of a signal of the first frequency band group and a signal of the second frequency band group is performed, by causing both the signals to pass through the diplexer 10, isolation between the signals can be ensured. Furthermore, in the case where independent transfer of a signal of the first frequency band group is performed (single mode), by causing the signal to pass through the diplexer 10, transfer loss increases by at least the amount of insertion loss of the filter 11. That is, even in the case where only a signal of the first band, out of the first band and the second band, is transferred in the single mode, since the signal passes through the diplexer 10, signal transfer loss increases.

[1.4 State of Circuit Connection of High Frequency Circuit 1]

Next, the state of circuit connection of the high frequency circuit 1 corresponding to a signal transfer mode will be described. The high frequency circuit 1 according to this embodiment is capable of performing at least (1) simultaneous transmission of a transmission signal of the first band and a transmission signal of the second band (multi-mode) and (2) independent transmission of a transmission signal of the first band (single mode). The high frequency circuit 1 is also capable of performing (3) simultaneous reception of a reception signal of the first band and a reception signal of the second band (multi-mode), (4) independent reception of a reception signal of the first band (single mode), (5) independent transmission of a transmission signal of the second band; and (6) independent reception of a reception signal of the second band, in addition to the two modes mentioned above.

Figure 3:
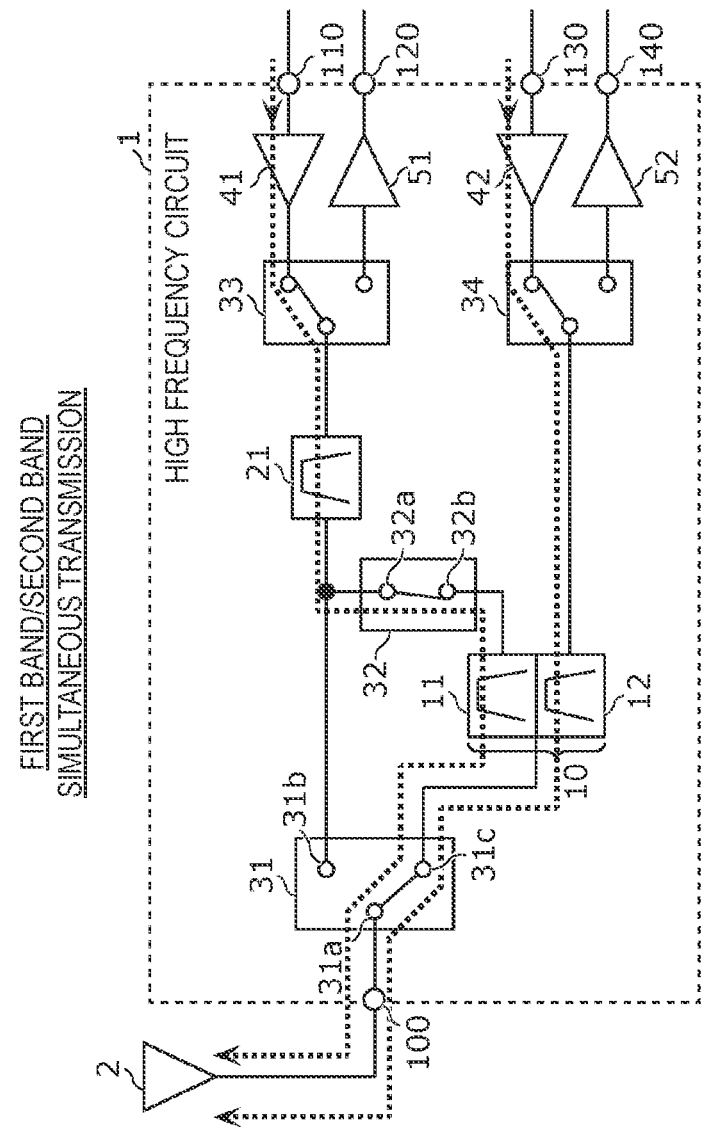
FIG. 3 is a diagram illustrating the state of the circuit at the time when simultaneous transmission using a first band and a second band is performed in the high frequency circuit according to the embodiment.

FIG. 3 is a diagram illustrating the state of the circuit at the time when simultaneous transmission using the first band and the second band is performed in the high frequency circuit 1 according to the embodiment.

In the case where (1) simultaneous transmission of a transmission signal of the first band and a transmission signal of the second band is performed, the terminal 31a and the terminal 31c are connected, the terminal 32a and the terminal 32b are connected, the filter 21 and the power amplifier 41 are connected, and the filter 12 and the power amplifier 42 are connected in FIG. 3. At this time, the transmission signal of the first band is transferred through a transmission path including the transmission input terminal 110, the power amplifier 41, the switch 33, the filter 21, the switch 32, the filter 11, the switch 31, and the antenna terminal 100. At the same time, the transmission signal of the second band is transferred through a transmission path including the transmission input terminal 130, the power amplifier 42, the switch 34, the filter 12, the switch 31, and the antenna terminal 100.

Accordingly, since both the transmission signal of the first band and the transmission signal of the second band pass through the diplexer 10, isolation between the two transmission signals is improved, and thus suppressing mutual interference.

Furthermore, although not illustrated in the drawings, in the case where (3) simultaneous reception of a reception signal of the first band and a reception signal of the second band is performed, the terminal 31a and the terminal 31c are connected, the terminal 32a and the terminal 32b are connected, the filter 21 and the low noise amplifier 51 are connected, and the filter 12 and the low noise amplifier 52 are connected.

Accordingly, since both the reception signal of the first band and the reception signal of the second band pass through the diplexer 10, isolation between the two reception signals is improved, thus suppressing mutual interference.

Figure 4:
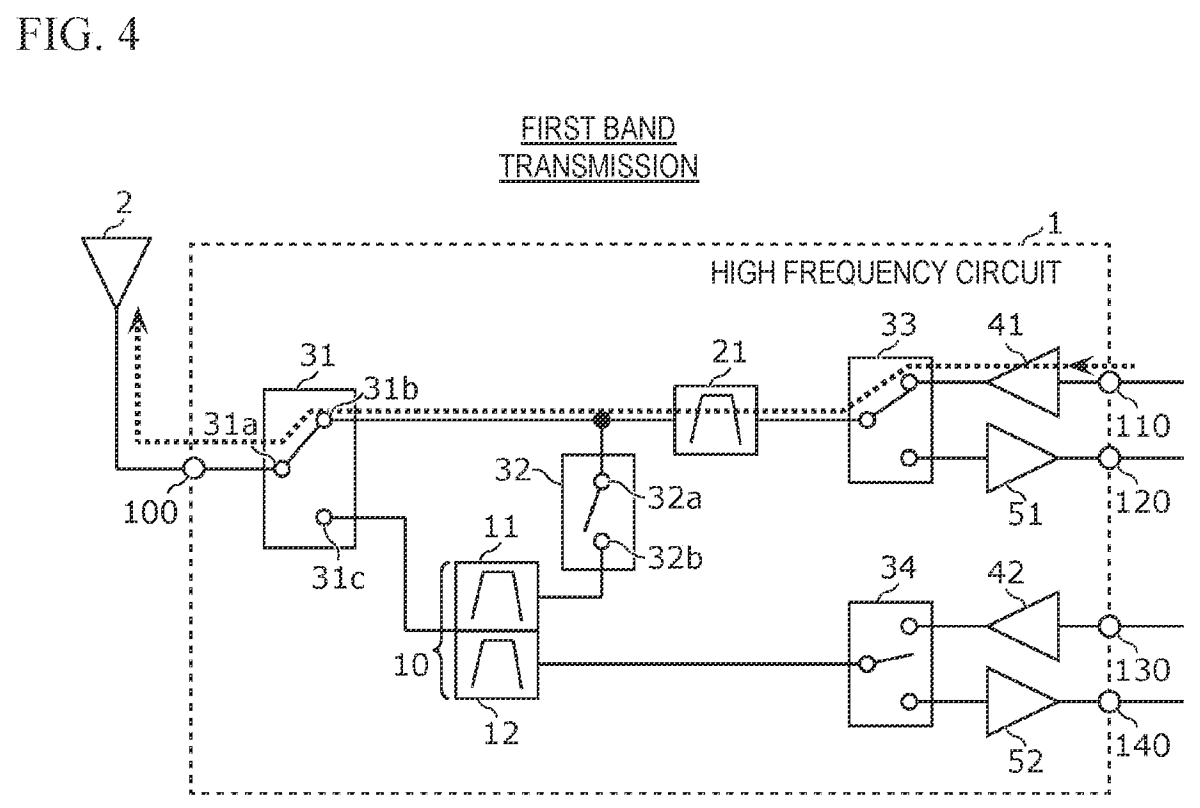

FIG. 4 is a diagram illustrating the state of the circuit at the time when independent transmission using the first band is performed in the high frequency circuit according to the embodiment.

In the case where (2) only a transmission signal of the first band, out of the first band and the second band, is transferred, the terminal 31a and the terminal 31b are connected, the terminal 32a and the terminal 32b are disconnected, and the filter 21 and the power amplifier 41 are connected in FIG. 4. At this time, the transmission signal of the first band is transferred through a transmission path including the transmission input terminal 110, the power amplifier 41, the switch 33, the filter 21, the switch 31, and the antenna terminal 100.

Accordingly, since there is no need to take into consideration interference between the transmission signal of the first band and a signal of the second band, the transmission signal of the first band does not need to pass through the diplexer 10. Thus, transfer loss of the transmission signal of the first band can be reduced by at least the amount of insertion loss of the filter 11.

Furthermore, although not illustrated in the drawings, in the case where (4) only a reception signal of the first band, out of the first band and the second band, is received, the terminal 31a and the terminal 31c are connected, the terminal 32a and the terminal 32b are disconnected, and the filter 21 and the low noise amplifier 51 are connected.

Accordingly, since there is no need to take into consideration interference between the reception signal of the first band and a signal of the second band, the reception signal of the first band does not need to pass through the diplexer 10. Thus, transfer loss of the reception signal of the first band can be reduced by at least the amount of insertion loss of the filter 11.

2. Circuit Configurations of High Frequency Circuit 1A and Communication Apparatus 5A According to Modification 1

Figure 5:
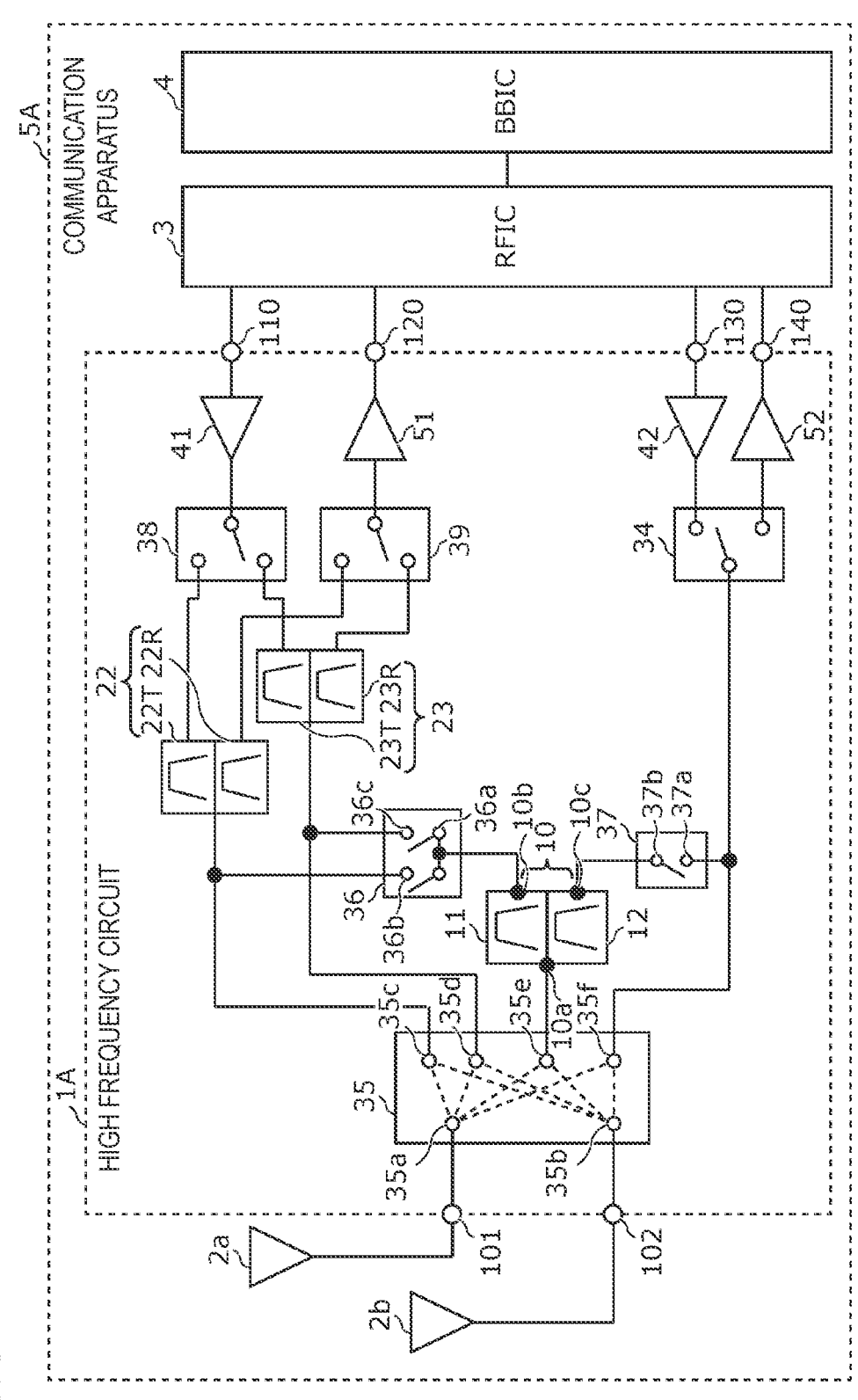
FIG. 5 is a circuit configuration diagram of a high frequency circuit and a communication apparatus according to Modification 1 of the embodiment.

Circuit configurations of a high frequency circuit 1A and a communication apparatus 5A according to Modification 1 of the embodiment will be described with reference to FIG. 5. FIG. 5 is a circuit configuration diagram of the high frequency circuit 1A and the communication apparatus 5A according to Modification 1 of the embodiment.

[2.1 Circuit Configuration of Communication Apparatus 5A]

As illustrated in FIG. 5, the communication apparatus 5A according to this modification includes the high frequency circuit 1A, antennas 2a and 2b, the RFIC 3, and the BBIC 4.

The high frequency circuit 1A transfers high frequency signals between the antennas 2a and 2b and the RFIC 3. The communication apparatus 5A according to this modification is different from the communication apparatus 5 according to the embodiment in configurations of the antennas 2a and 2b and the high frequency circuit 1A. Regarding the communication apparatus 5A according to this modification, differences from the communication apparatus 5 according to the embodiment will be mainly described below.

The antenna 2a is connected to an antenna terminal 101 of the high frequency circuit 1A and transmits a high frequency signal outputted from the high frequency circuit 1A. The antenna 2a also receives a high frequency signal from the outside and outputs the received high frequency signal to the high frequency circuit 1A. The antenna 2b is connected to an antenna terminal 102 of the high frequency circuit 1A and transmits a high frequency signal outputted from the high frequency circuit 1A. The antenna 2b also receives a high frequency signal from the outside and outputs the received high frequency signal to the high frequency circuit 1A.

In the communication apparatus 5A according to this modification, the antennas 2a and 2b and the BBIC 4 are not essential component elements.

[2.2 Circuit Configuration of High Frequency Circuit 1A]

As illustrated in FIG. 5, the high frequency circuit 1A includes the diplexer 10, duplexers 22 and 23, switches 34, 35, 36, 37, 38, and 39, the power amplifiers 41 and 42, the low noise amplifiers 51 and 52, the antenna terminals 101 and 102, the transmission input terminals 110 and 130, and the reception output terminals 120 and 140. The high frequency circuit 1A according to this modification is different from the high frequency circuit 1 according to the embodiment in that the duplexers for the first band and a third band that belong to the first frequency band group are arranged and the switch 37 for allowing only a signal of the second band belonging to the second frequency band group to be transferred with low loss is added. Regarding the high frequency circuit 1A according to this modification, differences from the high frequency circuit 1 according to the embodiment will be mainly described below.

The antenna terminal 101 is an example of a first antenna terminal and is connected to the antenna 2a. The antenna terminal 102 is an example of a second antenna terminal and is connected to the antenna 2b.

The duplexer 22 is an example of a first filter and includes a transmission filter 22T and a reception filter 22R. The transmission filter 22T has a pass band including an uplink operation band of the first band for FDD, and the reception filter 22R has a pass band including a downlink operation band of the first band for FDD. In the case where the first band is a band for TDD, instead of the duplexer 22, a filter that allows both a transmission signal and a reception signal of the first band to pass therethrough may be arranged.

The duplexer 23 is an example of a fourth filter and includes a transmission filter 23T and a reception filter 23R. The transmission filter 23T has a pass band including an uplink operation band of the third band for FDD, and the reception filter 23R has a pass band including a downlink operation band of the third band for FDD. In the case where the third band is a band for TDD, instead of the duplexer 23, a filter that allows both a transmission signal and a reception signal of the third band to pass therethrough may be arranged.

The power amplifier 41 is capable of amplifying transmission signals of the first band and the third band inputted from the RFIC 3. The power amplifier 41 is connected between the transmission input terminal 110 and the switch 38.

The low noise amplifier 51 is capable of amplifying reception signals of the first band and the third band inputted from the antenna 2. The low noise amplifier 51 is connected between the reception output terminal 120 and the switch 39.

The switch 35 is an example of a first switch circuit and includes terminals 35a (first terminal), 35b (eighth terminal), 35c (second terminal), 35d (ninth terminal), 35e (third terminal), and 35f (thirteenth terminal). The switch 35 switches between connection and disconnection between the terminal 35a and the terminals 35c to 35f and switches between connection and disconnection between the terminal 35b and the terminals 35c to 35f. The terminal 35a is connected to the antenna terminal 101, the terminal 35b is connected to the antenna terminal 102, the terminal 35c is connected to a common terminal (one terminal) of the duplexer 22, the terminal 35d is connected to a common terminal (one terminal) of the duplexer 23, the terminal 35e is connected to the terminal 10a, and the terminal 35f is connected to the switch 34.

The switch 36 is an example of a second switch circuit and includes terminals 36a (fifth terminal), 36b (fourth terminal), and 36c (tenth terminal). The switch 36 switches between connection and disconnection between the terminal 36a and the terminal 36b and switches between connection and disconnection between the terminal 36a and the terminal 36c. The terminal 36b is connected to the terminal 35c and the common terminal (one terminal) of the duplexer 22, the terminal 36c is connected to the terminal 35d and the common terminal (one terminal) of the duplexer 23, and the terminal 36a is connected to the terminal 10b.

The switch 37 is an example of a third switch circuit and includes terminals 37a (twelfth terminal) and 37b (eleventh terminal). The switch 37 switches between connection and disconnection between the terminal 37a and the terminal

37b. The terminal 37a is connected to the terminal 10c, and the terminal 37b is connected to the terminal 35f and the switch 34.

The switch 38 switches between connection between the transmission filter 22T and the power amplifier 41 and connection between the transmission filter 23T and the power amplifier 41. The switch 39 switches between connection between the reception filter 22R and the low noise amplifier 51 and connection between the reception filter 23R and the low noise amplifier 51.

With the configurations of the high frequency circuit 1A and the communication apparatus 5A described above, in the case where simultaneous transfer of a signal of the first frequency band group and a signal of the second frequency band group is performed, by causing both the signals to pass through the diplexer 10, isolation between the signals can be ensured. Furthermore, in the case where independent transfer of a signal of the first frequency band group is performed (single mode), by not causing the signal to pass through the diplexer 10, transfer loss of the signal can be reduced. Furthermore, in the case where independent transfer of a signal of the second frequency band group is performed (single mode), by not causing the signal to pass through the diplexer 10, transfer loss of the signal can be reduced. That is, the high frequency circuit 1A and the communication apparatus 5A supporting multiple bands and capable of transferring a signal in the single mode with low loss can be provided.

In the case where only the second band belongs to the second frequency band group and a signal of the second band is transferred using TDD in the high frequency circuit 1A, no filter needs to be provided between the diplexer 10 and the switch 34. Thus, reduction of the size of the high frequency circuit 1A can be achieved.

The high frequency circuit 1A according to Modification 1 does not necessarily include the power amplifiers 41 and 42, the low noise amplifiers 51 and 52, the switches 38, 39, and 34, the transmission input terminals 110 and 130, and the reception output terminals 120 and 140.

[2.3 State of Circuit Connection of High Frequency Circuit 1A]

Next, the state of circuit connection of the high frequency circuit 1A corresponding to a signal transfer mode will be described. The high frequency circuit 1A according to this modification is capable of performing at least (1) simultaneous transmission of a transmission signal of the first band and a transmission signal of the second band (multi-mode), (2) simultaneous transmission of a transmission signal of the third band and a transmission signal of the second band (multi-mode), (3) independent transmission of a transmission signal of the first band (single mode), (4) independent transmission of a transmission signal of the third band (single mode), (5) simultaneous transmission of a transmission signal of the first band and a transmission signal of the third band, and (6) independent transmission of a transmission signal of the second band (single mode). The high frequency circuit 1A can also perform (7) simultaneous reception of a reception signal of the first band and a reception signal of the second band (multi-mode), (8) simultaneous reception of a reception signal of the third band and a reception signal of the second band (multi-mode), (9) independent reception of a reception signal of the first band (single mode), (10) independent reception of a reception signal of the third band (single mode), (11) simultaneous reception of a reception signal of the first band and a reception signal of the third band, and (12) independent reception of a reception signal of the second band (single mode), in addition to the six modes mentioned above.

Figure 6:
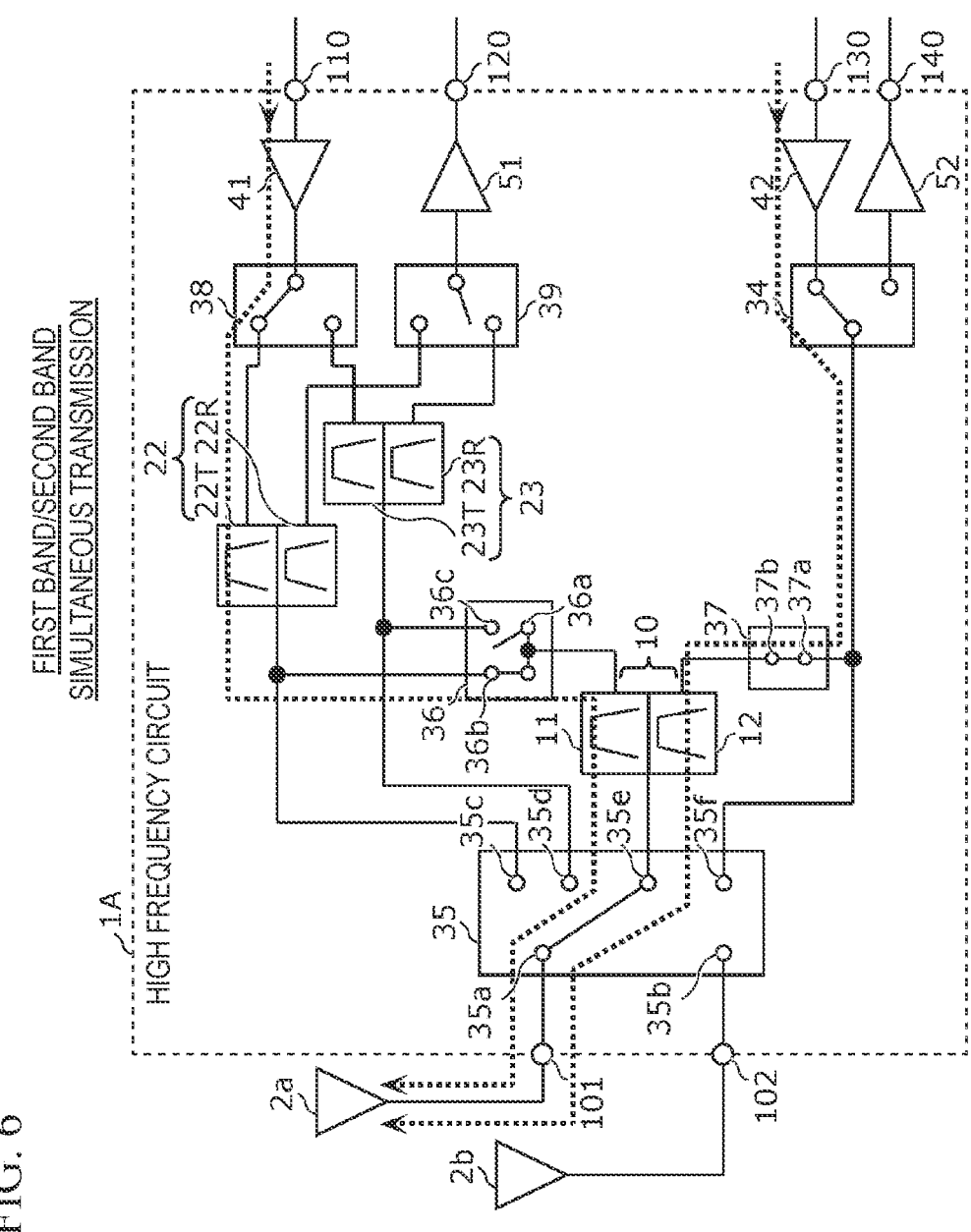
FIG. 6 is a diagram illustrating the state of the circuit at the time when simultaneous transmission using the first band and the second band is performed in the high frequency circuit according to Modification 1.

FIG. 6 is a diagram illustrating the state of the circuit at the time when simultaneous transmission using the first band and the second band is performed in the high frequency circuit 1A according to Modification 1.

In the case where (1) simultaneous transmission of a transmission signal of the first band and a transmission signal of the second band is performed, the terminal 35a and the terminal 35e are connected, the terminal 36a and the terminal 36b are connected, the terminal 37a and the terminal 37b are connected, the transmission filter 22T and the power amplifier 41 are connected, and the filter 12 and the power amplifier 42 are connected in FIG. 6. At this time, the transmission signal of the first band is transferred through a transmission path including the transmission input terminal 110, the power amplifier 41, the switch 38, the transmission filter 22T, the switch 36, the filter 11, the switch 35, and the antenna terminal 101. At the same time, the transmission signal of the second band is transferred through a transmission path including the transmission input terminal 130, the power amplifier 42, the switch 34, the switch 37, the filter 12, the switch 35, and the antenna terminal 101.

Accordingly, since both the transmission signal of the first band and the transmission signal of the second band pass through the diplexer 10, isolation between the two transmission signals is improved, thus suppressing mutual interference.

Furthermore, although not illustrated in the drawings, in the case where (2) simultaneous transmission of a transmission signal of the third band and a transmission signal of the second band is performed, the terminal 35a and the terminal 35e are connected, the terminal 36a and the terminal 36c are connected, the terminal 37a and the terminal 37b are connected, the transmission filter 23T and the power amplifier 41 are connected, and the filter 12 and the power amplifier 42 are connected. At this time, the transmission signal of the third band is transferred through a transmission path including the transmission input terminal 110, the power amplifier 41, the switch 38, the transmission filter 23T, the switch 36, the filter 11, the switch 35, and the antenna terminal 101. At the same time, the transmission signal of the second band is transferred through a transmission path including the transmission input terminal 130, the power amplifier 42, the switch 34, the switch 37, the filter 12, the switch 35, and the antenna terminal 101.

Accordingly, since both the transmission signal of the third band and the transmission signal of the second band pass through the diplexer 10, isolation between the two transmission signals is improved, thus suppressing mutual interference.

Furthermore, although not illustrated in the drawings, in the case where (3) only a signal of the first band, out of a signal of the first frequency band group and a signal of the second frequency band group, is transferred, the terminal 35a and the terminal 35c are connected, the terminal 36a and the terminal 36b are disconnected, and the transmission filter 22T and the power amplifier 41 are connected. At this time, the transmission signal of the first band is transferred through a transmission path including the transmission input terminal 110, the power amplifier 41, the switch 38, the transmission filter 22T, the switch 35, and the antenna terminal 101.

Accordingly, since there is no need to take into consideration interference between the transmission signal of the first band and a signal of the second band, the transmission signal of the first band does not need to pass through the diplexer 10. Thus, transfer loss of the transmission signal of the first band can be reduced by at least the amount of insertion loss of the filter 11.

Furthermore, although not illustrated in the drawings, in the case where (4) only a signal of the third band, out of a signal of the first frequency band group and a signal of the second frequency band group, is transferred, the terminal 35a and the terminal 35d are connected, the terminal 36a and the terminal 36c are disconnected, and the transmission filter 23T and the power amplifier 41 are connected. At this time, the transmission signal of the third band is transferred through a transmission path including the transmission input terminal 110, the power amplifier 41, the switch 38, the transmission filter 23T, the switch 35, and the antenna terminal 101.

Accordingly, since there is no need to take into consideration interference between the transmission signal of the third band and a signal of the second band, the transmission signal of the third band does not need to pass through the diplexer 10. Thus, transfer loss of the transmission signal of the third band can be reduced by at least the amount of insertion loss of the filter 11.

Furthermore, although not illustrated in the drawings, in the case where (5) simultaneous transfer of a signal of the first band and a signal of the third band is performed, the terminal 35a or 35b and the terminal 35c are connected, the terminal 35a or 35b and the terminal 35d are connected, the terminal 36a and the terminal 36b are disconnected, the terminal 36a and the terminal 36c are disconnected, and the transmission filters 22T and 23T and the power amplifier 41 are connected. At this time, the transmission signal of the first band is transferred through a transmission path including the transmission input terminal 110, the power amplifier 41, the switch 38, the transmission filter 22T, the switch 35, and the antenna terminal 101 or 102. Furthermore, the transmission signal of the third band is transferred through a transmission path including the transmission input terminal 110, the power amplifier 41, the switch 38, the transmission filter 23T, the switch 35, and the antenna terminal 101 or 102.

Accordingly, since there is no need to take into consideration interference between the transmission signals of the first band and the third band and a signal of the second band, the transmission signals of the first band and the third band do not need to pass through the diplexer 10. Thus, transfer loss of the transmission signals of the first band and the third band can be reduced by at least the amount of insertion loss of the filter 11.

Figure 7:
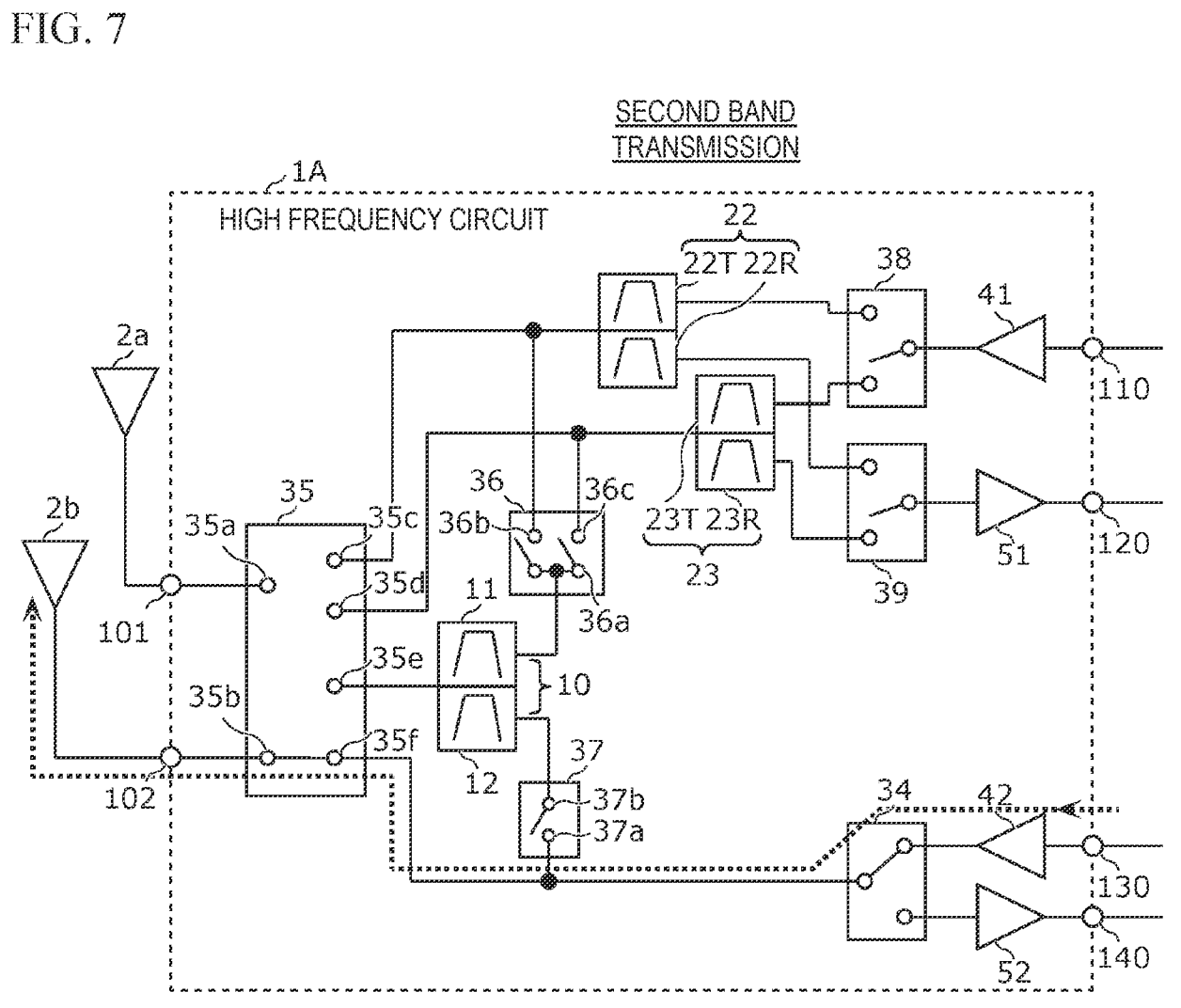

FIG. 7 is a diagram illustrating the state of the circuit at the time when independent transmission using the second band is performed in the high frequency circuit 1A according to Modification 1.

In the case where (6) only a signal of the second band, out of a signal of the first frequency band group and a signal of the second frequency band group, is transferred, the terminal 35b (or 35a) and the terminal 35f are connected, the terminal 37a and the terminal 37b are disconnected, and the terminal 35f and the power amplifier 42 are connected in FIG. 7. At this time, the transmission signal of the second band is transferred through a transmission path including the transmission input terminal 130, the power amplifier 42, the switch 34, the switch 35, and the antenna terminal 102 (or the antenna terminal 101).

Accordingly, since there is no need to take into consideration interference between the transmission signal of the second band and signals of the first band and the third band, the transmission signal of the second band does not need to pass through the diplexer 10. Thus, transfer loss of the transmission signal of the second band can be reduced by at least the amount of insertion loss of the filter 12.

3. Circuit Configurations of High Frequency Circuit 1B and Communication Apparatus 5B According to Modification 2

Figure 8:
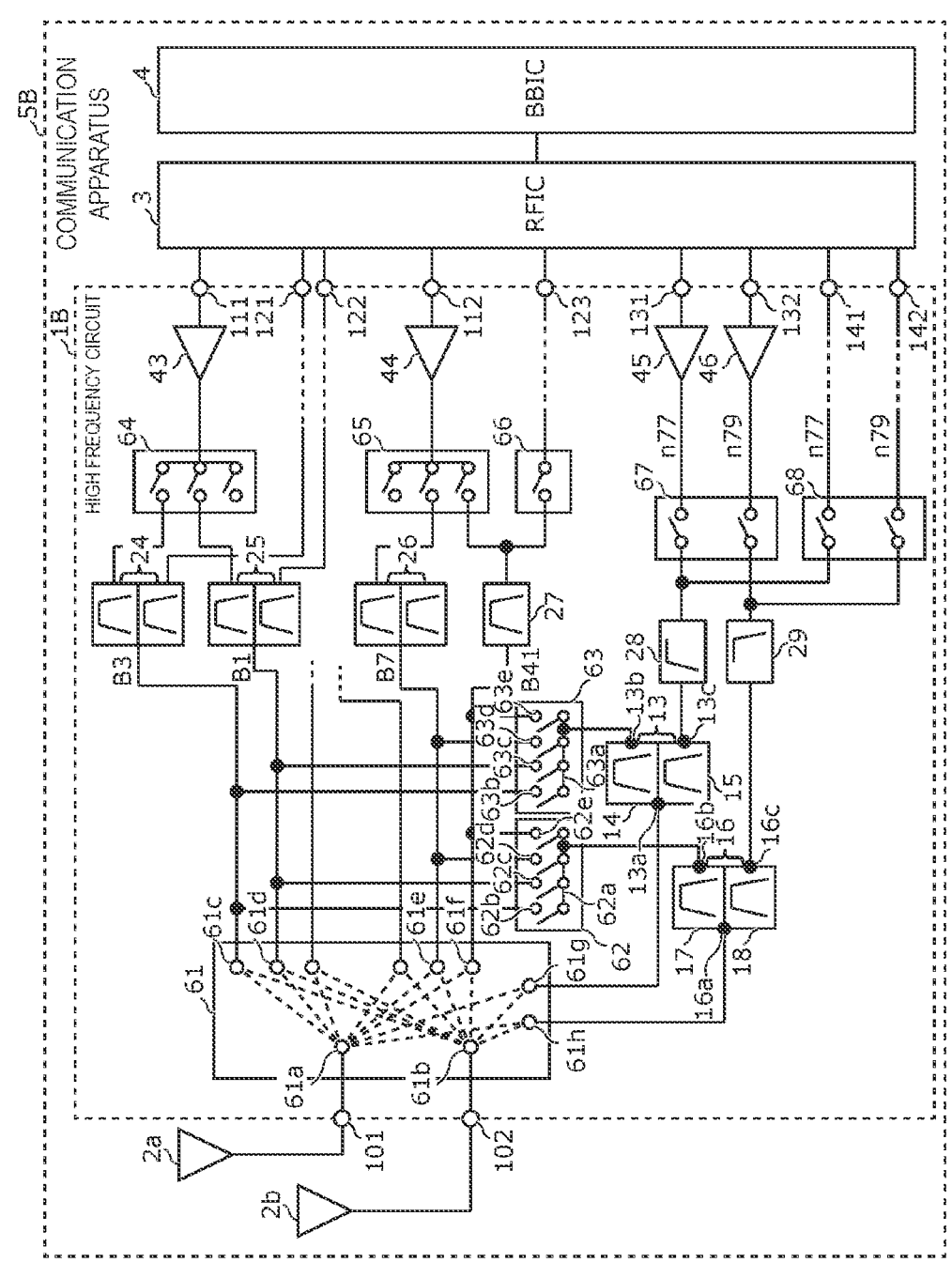
FIG. 8 is a circuit configuration diagram of a high frequency circuit and a communication apparatus according to Modification 2 of the embodiment.

Circuit configurations of a high frequency circuit 1B and a communication apparatus 5B according to Modification 2 of the embodiment will be described with reference to FIG. 8. FIG. 8 is a circuit configuration diagram of the high frequency circuit 1B and the communication apparatus 5B according to Modification 2 of the embodiment.

[3.1 Circuit Configuration of Communication Apparatus 5B]

As illustrated in FIG. 8, the communication apparatus 5B according to this modification includes the high frequency circuit 1B, the antennas 2a and 2b, the RFIC 3, and the BBIC 4.

The high frequency circuit 1B transfers high frequency signals between the antennas 2a and 2b and the RFIC 3. The communication apparatus 5B according to this modification is different from the communication apparatus 5 according to the embodiment in configurations of the antennas 2a and 2b and the high frequency circuit 1B. Regarding the communication apparatus 5B according to this modification, differences from the communication apparatus 5 according to the embodiment will be mainly described below.

The antenna 2a is connected to the antenna terminal 101 of the high frequency circuit 1B and transmits a high frequency signal outputted from the high frequency circuit 1B. The antenna 2a also receives a high frequency signal from the outside and outputs the received high frequency signal to the high frequency circuit 1B. The antenna 2b is connected to the antenna terminal 102 of the high frequency circuit 1B and transmits a high frequency signal outputted from the high frequency circuit 1B. The antenna 2b also receives a high frequency signal from the outside and outputs the received high frequency signal to the high frequency circuit 1B.

In the communication apparatus 5B according to this modification, the antennas 2a and 2b and the BBIC 4 are not essential component elements.

[3.2 Circuit Configuration of High Frequency Circuit 1B]

As illustrated in FIG. 8, the high frequency circuit 1B includes diplexers 13 and 16, duplexers 24, 25, and 26, a filter 27, a high pass filter 28, a low pass filter 29, switches 61, 62, 63, 64, 65, 66, 67, and 68, power amplifiers 43, 44, 45, and 46, the antenna terminals 101 and 102, transmission input terminals 111, 112, 131, and 132, and reception output terminals 121, 122, 123, 141, and 142. The high frequency circuit 1B according to this modification is different from the high frequency circuit 1 according to the embodiment in that duplexers and filters for four bands belonging to the first frequency band group are arranged and filters for two bands belonging to the second frequency band group are arranged. Regarding the high frequency circuit 1B according to this modification, differences from the high frequency circuit 1 according to the embodiment will be mainly described below.

The antenna terminal 101 is an example of a first antenna terminal and is connected to the antenna 2a. The antenna terminal 102 is an example of a second antenna terminal and is connected to the antenna 2b.

The diplexer 13 is an example of a first multiplexer and includes terminals 13a (first common terminal), 13b (sixth terminal), and 13c (seventh terminal) and filters 14 and 15.

The filter 14 is an example of a second filter and is a filter that is connected between the terminals 13a and 13b and has a pass band including the first frequency band group but not including the second frequency band group. The filter 15 is an example of a third filter and is a filter that is connected between the terminals 13a and 13c and has a pass band including a fourth band belonging to the second frequency band group, where frequencies in the second frequency band group and frequencies in the first frequency band group do not overlap, but not including the first frequency band group. For example, band n77 for 5G-NR is used as the fourth band.

The diplexer 16 is an example of a second multiplexer and includes terminals 16a (second common terminal), 16b (fourteenth terminal), and 16c (fifteenth terminal) and filters 17 and 18. The filter 17 is an example of a fifth filter and is a filter that is connected between the terminals 16a and 16b and has a pass band including the first frequency band group but not including the second frequency band group. The filter 18 is an example of a sixth filter and is a filter that is connected between the terminals 16a and 16c and has a pass band including a fifth band belonging to the second frequency band group and higher than the fourth band but not including the first frequency band group. For example, band n79 for 5G-NR is used as the fifth band.

Each of the first multiplexer and the second multiplexer is not limited to a diplexer and may be a multiplexer that demultiplexes and/or multiplexes three or more frequency band groups.

The duplexer 24 is an example of a first filter and includes a transmission filter and a reception filter. The transmission filter of the duplexer 24 has a pass band including an uplink operation band of the first band for FDD, and the reception filter of the duplexer 24 has a pass band including a downlink operation band of the first band for FDD. For example, band B3 for 4G-LTE is used as the first band. In the case where the first band is a band for TDD, instead of the duplexer 24, a filter that allows both a transmission signal and a reception signal of the first band to pass therethrough may be arranged.

The duplexer 25 is an example of a third filter and includes a transmission filter and a reception filter. The transmission filter of the duplexer 25 has a pass band including an uplink operation band of the third band for FDD, and the reception filter of the duplexer 25 has a pass band including a downlink operation band of the third band for FDD. For example, band B1 for 4G-LTE is used as the third band. In the case where the third band is a band for TDD, instead of the duplexer 25, a filter that allows both a transmission signal and a reception signal of the third band to pass therethrough may be arranged.

The duplexer 26 includes a transmission filter and a reception filter. For example, band B7 for 4G-LTE is used as a pass band of the duplexer 26. Instead of the duplexer 26, a filter for TDD that allows both a transmission signal and a reception signal to pass therethrough may be arranged.

The filter 27 is a filter for TDD and, for example, band B41 for 4G-LTE is used as a pass band of the filter 27. The filter 27 may be a duplexer for FDD.

The high pass filter 28 is a filter of a high pass type that uses the fourth band as a pass band and uses a frequency band lower than the fourth band as an attenuation band. The low pass filter 29 is a filter of a low pass type that uses the fifth band as a pass band and uses a frequency band higher than the fifth band as an attenuation band.

With the high pass filter 28, deterioration of receiving sensitivity caused by a second harmonic that is twice the transmission band of the first band or the third band that belongs to the first frequency band group flowing into a reception path for the fourth band and deterioration of the signal quality of a transmission signal of the fourth band caused by the second harmonic being superimposed on the transmission signal of the fourth band can be suppressed. Instead of the high pass filter 28, a notch filter that uses the fifth band as a stopband may be arranged. Accordingly, mutual interference between a signal of the fourth band and a signal of the fifth band can be reduced.

With the low pass filter 29, deterioration of receiving sensitivity caused by a signal of a frequency band (for example, WLAN 5 GHz band) higher than the fifth band flowing into a reception path for the fifth band and deterioration of the signal quality of a transmission signal of the fifth band caused by the signal of the WLAN 5 GHz band being superimposed on the transmission signal of the fifth band can be suppressed. Instead of the low pass filter 29, a notch filter that uses the fourth band as a stopband may be arranged. Accordingly, mutual interference between a signal of the fourth band and a signal of the fifth band can be reduced.

The power amplifier 43 is capable of amplifying transmission signals of the first band and the third band inputted from the RFIC 3. The power amplifier 43 is connected between the transmission input terminal 111 and the switch 64. The power amplifier 44 is capable of amplifying, for example, transmission signals of band B7 and band B41 for 4G-LTE inputted from the RFIC 3. The power amplifier 44 is connected between the transmission input terminal 112 and the switch 65.

The power amplifier 45 is capable of amplifying a transmission signal of the fourth band inputted from the RFIC 3. The power amplifier 45 is connected between the transmission input terminal 131 and the switch 67. The power amplifier 46 is capable of amplifying a transmission signal of the fifth band inputted from the RFIC 3. The power amplifier 46 is connected between the transmission input terminal 132 and the switch 67.

In the high frequency circuit 1B, a low noise amplifier may be disposed between the reception filter of the duplexer 24 and the reception output terminal 121, between the reception filter of the duplexer 25 and the reception output terminal 122, between the switch 66 and the reception output terminal 123, between the switch 68 and the reception output terminal 141, and between the switch 68 and the reception output terminal 142.

The switch 61 is an example of a first switch circuit and includes terminals 61a (first terminal), 61b (eighth terminal), 61c (second terminal), 61d (ninth terminal), 61e, 61f, 61g (third terminal), and 61h (nineteenth terminal). The switch 61 switches between connection and disconnection between the terminal 61a and the terminals 61c to 61h and switches between connection and disconnection between the terminal 61b and the terminals 61c to 61h. The terminal 61a is connected to the antenna terminal 101, the terminal 61b is connected to the antenna terminal 102, the terminal 61c is connected to a common terminal of the duplexer 24, the terminal 61d is connected to a common terminal of the duplexer 25, the terminal 61e is connected to a common terminal of the duplexer 26, the terminal 61f is connected to one terminal of the filter 27, the terminal 61g is connected to the terminal 13a, and the terminal 61h is connected to the terminal 16a.

The switch 63 is an example of a second switch circuit and includes terminals 63a (fifth terminal), 63b (fourth terminal), 63c (tenth terminal), 63d, and 63e. The switch 63 switches between connection and disconnection between the terminal 63a and the terminal 63b, switches between connection and disconnection between the terminal 63a and the terminal 63c, switches between connection and disconnection between the terminal 63a and the terminal 63d, and switches between connection and disconnection between the terminal 63a and the terminal 63e. The terminal 63a is connected to the terminal 13b, the terminal 63b is connected to the terminal 61c and the common terminal of the duplexer 24, the terminal 63c is connected to the terminal 61d and the common terminal of the duplexer 25, the terminal 63d is connected to the terminal 61e and the common terminal of the duplexer 26, and the terminal 63e is connected to the terminal 61f and the one terminal of the filter 27.

The switch 62 is an example of a fourth switch circuit and includes terminals 62a (sixteenth terminal), 62b (seventeenth terminal), 62c (eighteenth terminal), 62d, and 62e. The switch 62 switches between connection and disconnection between the terminal 62a and the terminal 62b, switches between connection and disconnection between the terminal 62a and the terminal 62c, switches between connection and disconnection between the terminal 62a and the terminal 62d, and switches between connection and disconnection between the terminal 62a and the terminal 62e. The terminal 62a is connected to the terminal 16b, the terminal 62b is connected to the terminal 61c and the common terminal of the duplexer 24, the terminal 62c is connected to the terminal 61d and the common terminal of the duplexer 25, the terminal 62d is connected to the terminal 61e and the common terminal of the duplexer 26, and the terminal 62e is connected to the terminal 61f and the one terminal of the filter 27.

One terminal of the high pass filter 28 is connected to the terminal 13c, and one terminal of the low pass filter 29 is connected to the terminal 16c.

The switch 64 switches between connection between the transmission filter of the duplexer 24 and the power amplifier 43 and connection between the transmission filter of the duplexer 25 and the power amplifier 43. The switch 65 switches between connection between the transmission filter of the duplexer 26 and the power amplifier 44 and connection between the filter 27 and the power amplifier 44. The switch 66 switches between connection and disconnection between the filter 27 and the reception output terminal 123 (or a low noise amplifier).

The switch 67 switches between connection between the other terminal of the high pass filter 28 and the power amplifier 45 and connection between the other terminal of the low pass filter 29 and the power amplifier 46.

The switch 68 switches between connection between the other terminal of the high pass filter 28 and the reception output terminal 141 (or a low noise amplifier) and connection between the other terminal of the low pass filter 29 and the reception output terminal 142 (or a low noise amplifier).

In this modification, for example, HB, MHB, LB, and the like including frequencies of 3 GHz or less are used as the first frequency band group. Furthermore, for example, UHB and other bands including frequencies of 3 GHz or more are used as the second frequency band group. The power amplifiers 45 and 46 that amplify signals of the second frequency band group support power class 2 (maximum output power: 26 dBm). Meanwhile, the power amplifiers 43 and 44 that amplify signals of the first frequency band group support power class 2 or 3 (maximum output power: 23 dBm).

Power class is a classification of the output power of a terminal defined by the maximum output power, and a power class with a smaller value allows a higher maximum output power. The maximum output power is defined by output power at an antenna end of a terminal.

With the configurations of the high frequency circuit 1B and the communication apparatus 5B described above, in the case where simultaneous transfer of a signal of the first frequency band group and a signal of the second frequency band group is performed, by causing both the signals to pass through the diplexer 13 or 16, isolation between the signals can be ensured. Furthermore, in the case where independent transfer of a signal of the first frequency band group is performed (single mode), by not causing the signal to pass through the diplexer 13 or 16, transfer loss of the signal can be reduced. That is, the high frequency circuit 1B and the communication apparatus 5B supporting multiple bands and capable of transferring a signal in the single mode with low loss can be provided.

[3.3 Circuit Configuration of High Frequency Circuit According to Comparative Example 2]

Figure 9:
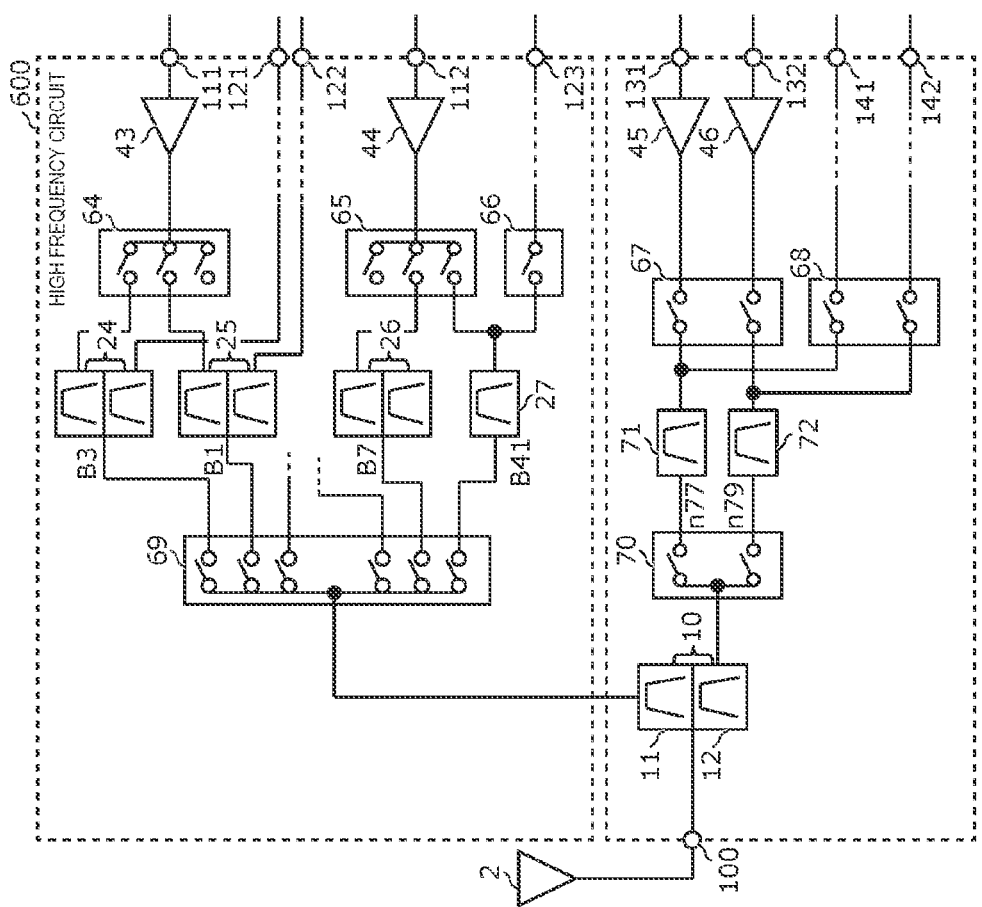
FIG. 9 is a circuit configuration diagram of a high frequency circuit according to Comparative Example 2.

The circuit configuration of Comparative Example 2 corresponding to a conventional art will now be described. FIG. 9 is a circuit configuration diagram of a high frequency circuit 600 according to Comparative Example 2. The high frequency circuit 600 includes the diplexer 10, the duplexers 24, 25, and 26, the filter 27, band pass filters 71 and 72, switches 64, 65, 66, 67, 68, 69, and 70, the power amplifiers 43, 44, 45, and 46, the antenna terminal 100, the transmission input terminals 111, 112, 131, and 132, the reception output terminals 121, 122, 123, 141, and 142. The high frequency circuit 600 according to Comparative Example 2 is different from the high frequency circuit 1B according to Modification 2 of the embodiment in that the switches 61 to 63 are not arranged and a single diplexer 10 is arranged instead of the two diplexers 13 and 16. Regarding the high frequency circuit 600 according to Comparative Example 2, description of the same configurations as those of the high frequency circuit 1B according to Modification 2 of the embodiment will be omitted, and differences will be mainly described below.

The diplexer 10 includes a first common terminal, a sixth terminal, a seventh terminal, and the filters 11 and 12. The filter 11 is a filter that is connected between the first common terminal and the sixth terminal and has a pass band including the first frequency band group containing the first band. The filter 12 is a filter that is connected between the first common terminal and the seventh terminal and has a pass band including the second frequency band group, where frequencies in the second frequency band group and frequencies in the first frequency band group do not overlap. The first common terminal is connected to the antenna terminal 100, the sixth terminal is connected to the switch 69, and the seventh terminal is connected to the switch 70.

The band pass filter 71 is a filter of a band pass type that uses the fourth band as a pass band. The band pass filter 72 is a filter of a band pass type that uses the fifth band, which is higher than the fourth band, as a pass band.

The switch 69 is disposed between the filter 11, and the duplexers 24 to 26 and the filter 27, and switches between connection and disconnection between the filter 11, and the duplexers 24 to 26 and the filter 27.

The switch 70 is disposed between the filter 12 and the band pass filters 71 and 72, and switches between connection and disconnection between the filter 12 and the band pass filters 71 and 72.

With the configuration of the high frequency circuit 600 according to Comparative Example 2 described above, in the case where simultaneous transfer of a signal of the first frequency band group and a signal of the second frequency band group is performed, by causing both signals to pass through the diplexer 10, isolation between the signals can be ensured. Furthermore, also in the case where independent transfer of a signal of the first frequency band group is performed (single mode), by causing the signal of the first frequency band group to pass through the diplexer 10, transfer loss increases by at least the amount of insertion loss of the filter 11. That is, even in the case where only a signal of the first band, out of the first band and the second band, is transferred in the single mode, since the signal passes through the diplexer 10, signal transfer loss increases.

Furthermore, in the high frequency circuit 600 according to Comparative Example 2, the band pass filters 71 and 72 that use the fourth band and the fifth band of the second frequency band group as pass bands are arranged. However, pass bands and attenuation characteristics of the filter 12 of the diplexer 10 and, in particular, the band pass filter 71 that uses the fourth band, which is a wide band for TDD, as a pass band and the band pass filter 72 that uses the fifth band as a pass band overlap partially. Furthermore, circuit configurations of the two band pass filters 71 and 72 are complicated, and the circuits of the band pass filters 71 and 72 are large in size.

In contrast, in the high frequency circuit 1B according to Modification 2 of the embodiment, the high pass filter 28, instead of the band pass filter 71 that uses the fourth band as the pass band, is arranged, and the low pass filter 29, instead of the band pass filter 72 that uses the fifth band as the pass band, is arranged. Thus, the circuit configuration of the filters disposed between the filter 12 and the switches 67 and 68 can be simplified, and insertion loss of a pass band that is other than a stopband can be reduced. Therefore, a signal of the fourth band and a signal of the fifth band can be transferred with low loss. Consequently, the simplified and compact high frequency circuit 1B that is capable of transferring signals of different TDD bands with low loss can be provided.

[3.4 State of Circuit Connection of High Frequency Circuit 1B]

Next, the state of circuit connection of the high frequency circuit 1B corresponding to a signal transfer mode will be described. The high frequency circuit 1B according to this modification is capable of performing at least (1) simultaneous transmission of a transmission signal of the first band and a transmission signal of the fourth band (multi-mode), (2) simultaneous transmission of a transmission signal of the first band and a transmission signal of the fifth band (multi-mode), (3) independent transmission of a transmission signal of the first band (single mode), (4) independent transmission of a transmission signal of the third band (single mode), and (5) simultaneous transmission of a transmission signal of the first band and a transmission signal of the third band. The high frequency circuit 1B is also capable of performing (6) simultaneous reception of a reception signal of the first band and a reception signal of the fourth band (multi-mode), (7) simultaneous reception of a reception signal of the first band and a reception signal of the fifth band (multi-mode), (8) independent reception of a reception signal of the first band (single mode), (9) independent reception of a reception signal of the third band (single mode), and (10) simultaneous reception of a reception signal of the first band and a reception signal of the third band, in addition to the five modes mentioned above.

Figure 10:
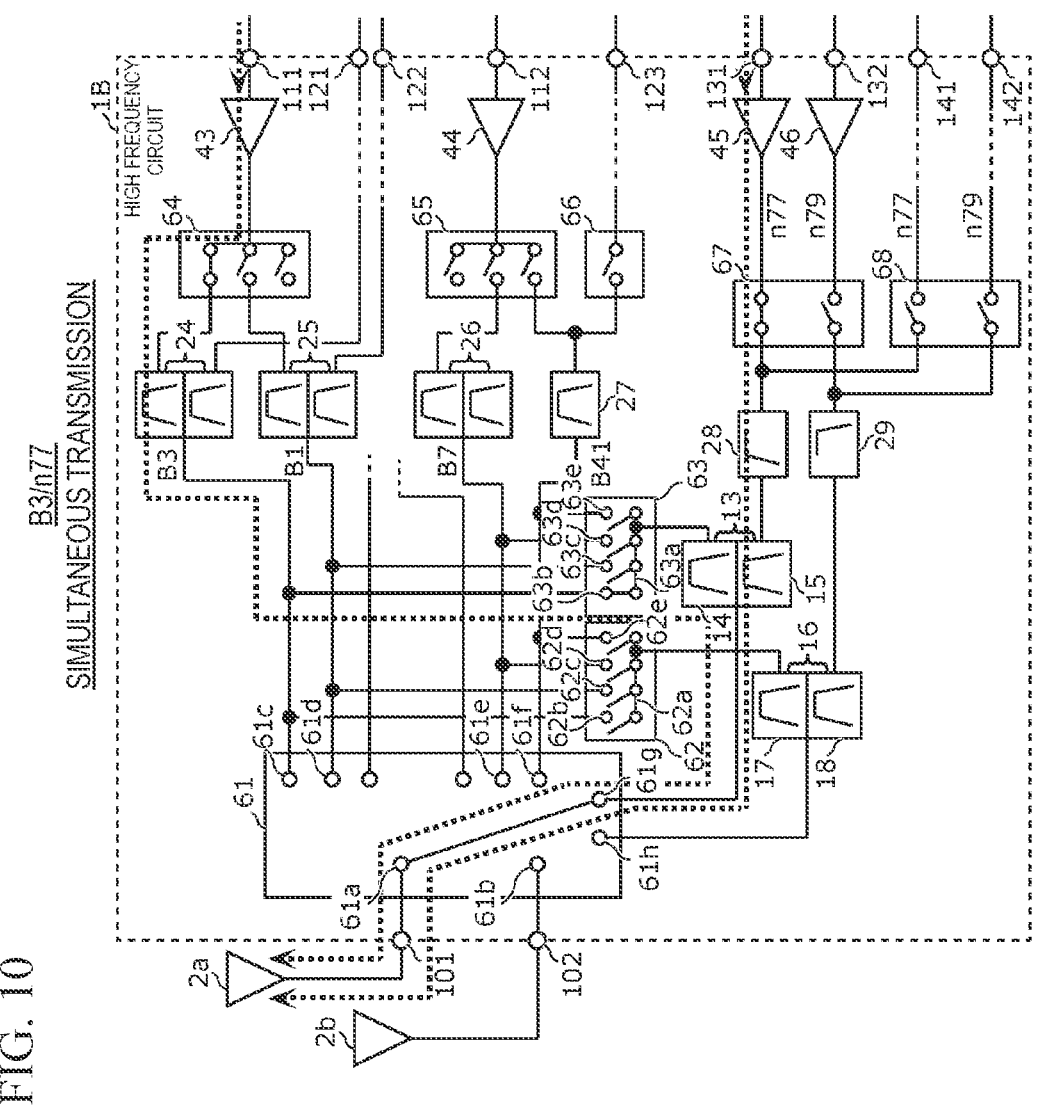
FIG. 10 is a diagram illustrating the state of the circuit at the time when simultaneous transmission using the first band and a fourth band is performed in the high frequency circuit according to Modification 2.

FIG. 10 is a diagram illustrating the state of the circuit at the time when simultaneous transmission using the first band and the fourth band is performed in the high frequency circuit 1B according to Modification 2.

In the case where (1) simultaneous transmission of a transmission signal of the first band (B3) and a transmission signal of the fourth band (n77) is performed, the terminal 61*a* and the terminal 61*g* are connected, the terminal 63*a* and the terminal 63*b* are connected, the transmission filter of the duplexer 24 and the power amplifier 43 are connected, and the high pass filter 28 and the power amplifier 45 are connected in FIG. 10. At this time, the transmission signal of the first band is transferred through a transmission path including the transmission input terminal 111, the power amplifier 43, the switch 64, the transmission filter of the duplexer 24, the switch 63, the filter 14, the switch 61, and the antenna terminal 101. At the same time, the transmission signal of the fourth band is transferred through a transmission path including the transmission input terminal 131, the power amplifier 45, the switch 67, the high pass filter 28, the filter 15, the switch 61, and the antenna terminal 101.

Accordingly, since both the transmission signal of the first band and the transmission signal of the fourth band pass through the diplexer 13, isolation between the two transmission signals is improved, thus suppressing mutual interference.

Furthermore, although not illustrated in the drawings, in the case where (2) simultaneous transmission of a transmission signal of the first band (B3) and a transmission signal of the fifth band (n79) is performed, the terminal 61*a* and the terminal 61*h* are connected, the terminal 62*a* and the terminal 62*b* are connected, the transmission filter of the duplexer 24 and the power amplifier 43 are connected, and the low pass filter 29 and the power amplifier 46 are connected. At this time, the transmission signal of the first band is transferred through a transmission path including the transmission input terminal 111, the power amplifier 43, the switch 64, the transmission filter of the duplexer 24, the switch 62, the filter 17, the switch 61, and the antenna terminal 101. At the same time, the transmission signal of the fifth band is transferred through a transmission path including the transmission input terminal 132, the power amplifier 46, the switch 67, the low pass filter 29, the filter 18, the switch 61, and the antenna terminal 101.

Accordingly, since both the transmission signal of the first band and the transmission signal of the fifth band pass through the diplexer 16, isolation between the two transmission signals is improved, thus suppressing mutual interference.

Figure 11:
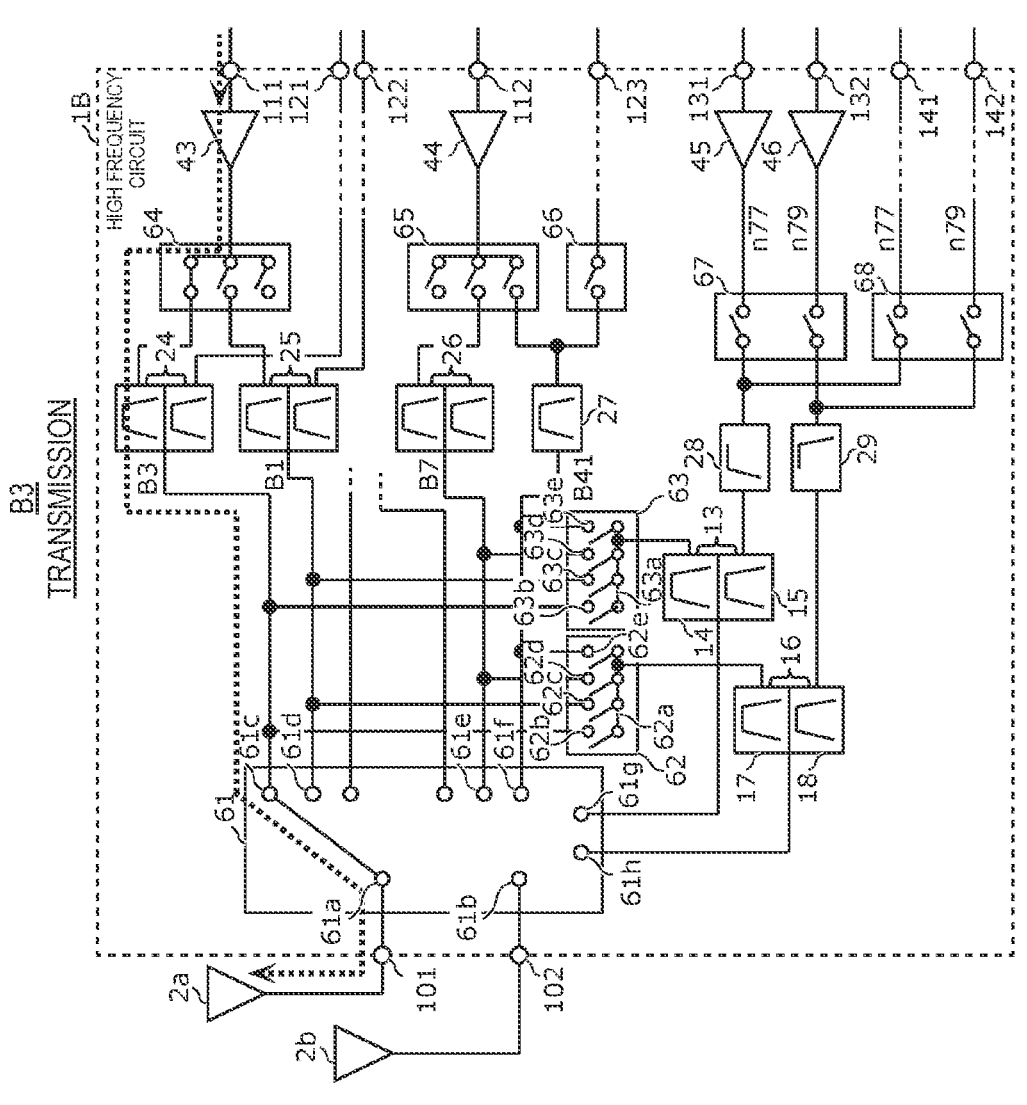
FIG. 11 is a diagram illustrating the state of the circuit at the time when independent transmission using the first band is performed in the high frequency circuit according to Modification 2.

FIG. 11 is a diagram illustrating the state of the circuit at the time when independent transmission using the first band is performed in the high frequency circuit 1B according to Modification 2.

In the case where (3) only a signal of the first band, out of a signal of the first frequency band group and a signal of the second frequency band group, is transferred, the terminal 61*a* and the terminal 61*c* are connected, the terminal 63*a* and the terminal 63*b* are disconnected, the terminal 62*a* and the terminal 62*b* are disconnected, and the transmission filter of the duplexer 24 and the power amplifier 43 are connected. At this time, the transmission signal of the first band is transferred through the transmission input terminal 111, the power amplifier 43, the switch 64, the transmission filter of the duplexer 24, the switch 61, and the antenna terminal 101.

Accordingly, since there is no need to take into consideration interference between the transmission signal of the first band and signals of the fourth band and the fifth band, the transmission signal of the first band does not need to pass through the diplexer 13 or 16. Thus, transfer loss of the transmission signal of the first band can be reduced by at least the amount of insertion loss of the filters 14 and 17.

Furthermore, although not illustrated in the drawings, in the case where (4) only a signal of the third band, out of a signal of the first frequency band group and a signal of the second frequency band group, is transferred, the terminal 61*a* and the terminal 61*d* are connected, the terminal 63*a* and the terminal 63*c* are disconnected, the terminal 62*a* and the terminal 62*c* are disconnected, and the transmission filter of the duplexer 25 and the power amplifier 43 are connected. At this time, the transmission signal of the third band is transferred through a transmission path including the transmission input terminal 111, the power amplifier 43, the switch 64, the transmission filter of the duplexer 25, the switch 61, and the antenna terminal 101.

Accordingly, since there is no need to take into consideration interference between the transmission signal of the third band and signals of the fourth band and the fifth band, the transmission signal of the third band does not need to pass through the diplexer 13 or 16. Thus, transfer loss of the transmission signal of the third band can be reduced by at least the amount of insertion loss of the filters 14 and 17.

Furthermore, although not illustrated in the drawings, in the case where (5) simultaneous transfer of a signal of the first band and a signal of the third band is performed, the terminal 61*a* or 61*b* and the terminal 61*c* are connected, the terminal 61*a* or 61*b* and the terminal 61*d* are connected, the terminal 63*a* and the terminal 63*b* are disconnected, the terminal 63*a* and the terminal 63*c* are disconnected, the terminal 62*a* and the terminal 62*b* are disconnected, the terminal 62*a* and the terminal 62*c* are disconnected, and the transmission filters of the duplexers 24 and 25 and the power amplifier 43 are connected. At this time, the transmission signal of the first band is transferred through a transmission path including the transmission input terminal 111, the power amplifier 43, the switch 64, the transmission filter of the duplexer 24, the switch 61, and the antenna terminal 101 or 102. Furthermore, the transmission signal of the third band is transferred through a transmission path including the transmission input terminal 111, the power amplifier 43, the switch 64, the transmission filter of the duplexer 25, the switch 61, and the antenna terminal 101 or 102.

Accordingly, since there is no need to take into consideration interference between the transmission signals of the first band and the third band and signals of the third band and the fourth band, the transmission signals of the first band and the third band do not need to pass through the diplexer 13 or 16. Thus, transfer loss of the transmission signals of the first band and the third band can be reduced by at least the amount of insertion loss of the filters 14 and 17.

4. Effects and Others

As described above, the high frequency circuit 1 according to an embodiment includes the antenna terminal 100, the switch 31 that includes the terminals 31*a*, 31*b*, and 31*c*, the switch 32 that includes the terminals 32*a* and 32*b*, the filter 21 that has a pass band including a first band, and the diplexer 10 that includes the terminals 10*a*, 10*b*, and 19*c*. The diplexer 10 includes the filter 11 that is connected between the terminals 10*a* and 10*b* and has a pass band including a first frequency band group containing the first band but not including a second frequency band group and the filter 12 that is connected between the terminals 10*a* and 10*c* and has a pass band including the second frequency band group but not including the first frequency band group. The terminal 31*a* is connected to the antenna terminal 100, the terminals 31b and 32a are connected to one terminal of the filter 21, the terminal 31c is connected to the terminal 10a, and the terminal 32b is connected to the terminal 10b.

Accordingly, in the case where simultaneous transfer of a signal of the first frequency band group and a signal of the second frequency band group is performed, by causing both the signals to pass through the diplexer 10, isolation between the signals can be ensured. Furthermore, in the case where independent transfer of a signal of the first frequency band group is performed, by not causing the signal to pass through the diplexer 10, transfer loss of the signal can be reduced. That is, the high frequency circuit 1 supporting multiple bands and capable of transferring a signal in the single mode with low loss can be provided.

Furthermore, for example, in the case where simultaneous transfer of a signal of the first band and a signal of a second band belonging to the second frequency band group is performed in the high frequency circuit 1, the terminal 31a and the terminal 31c may be connected, and the terminal 32a and the terminal 32b may be connected. In the case where only a signal of the first frequency band group, out of a signal of the first frequency band group and a signal of the second frequency band group, is transferred, the terminal 31a and the terminal 31b may be connected, and the terminal 32a and the terminal 32b may be disconnected.

Accordingly, in the case where simultaneous transfer of a signal of the first band and a signal of the second band is performed, since both the signal of the first band and the signal of the second band pass through the diplexer 10, isolation between the two transmission signals is improved, thus suppressing mutual interference. Furthermore, in the case where only a signal of the first band is transferred, since there is no need to take into consideration interference between the signal of the first band and a signal of the second band, the signal of the first band does not need to pass through the diplexer 10. Thus, transfer loss of the signal of the first band can be reduced by at least the amount of insertion loss of the filter 11.

Furthermore, for example, in the high frequency circuit 1, the first frequency band group may include frequencies of 3 GHz or less, and the second frequency band group may include frequencies of 3 GHz or more.

Furthermore, for example, in the high frequency circuit 1, the first band may be a band to which FDD is applied, and the second band may be a band to which TDD is applied.

Accordingly, in the case where only the second band belongs to the second frequency band group, no filter needs to be provided between the diplexer 10 and the switch 34. Thus, reduction of the size of the high frequency circuit 1 can be achieved.

Furthermore, for example, the high frequency circuit 1A may further include the antenna terminal 102 and a fourth filter that has a pass band including a third band belonging to the first frequency band group, in addition to the antenna terminal 101. The switch 35 may further include the terminals 35b and 35d, in addition to the terminals 35a, 35c, and 35e. The switch 36 may further include the terminal 36c, in addition to the terminals 36a and 36b. The terminal 35b may be connected to the antenna terminal 102. The terminals 35d and 36c may be connected to one terminal of the fourth filter.

Accordingly, in the case where simultaneous transfer of a signal of the first frequency band group and a signal of the second frequency band group is performed, by causing both the signals to pass through the diplexer 10, isolation between the signals can be ensured. Furthermore, in the case where independent transfer of a signal of the first band is performed, in the case where independent transfer of a signal of the third band is performed, and in the case where simultaneous transfer of a signal of the first band and a signal of the third band is performed, by not causing the signal(s) to pass through the diplexer 10, transfer loss of the signal(s) can be reduced. That is, the high frequency circuit 1A supporting multiple bands and capable of transferring only a signal of the first frequency band group with low loss can be provided.

Furthermore, for example, in the high frequency circuit 1A, in the case where simultaneous transfer of a signal of the first band and a signal of the second band is performed, the terminal 35a and the terminal 35e may be connected, and the terminal 36a and the terminal 36b may be connected. In the case where simultaneous transfer of a signal of the third band and a signal of the second band is performed, the terminal 35a and the terminal 35e may be connected, and the terminal 36a and the terminal 36c may be connected. In the case where only a signal of the first band, out of a signal of the first frequency band group and a signal of the second frequency band group, is transferred, the terminal 35a and the terminal 35c may be connected, and the terminal 36a and the terminal 36b may be disconnected. In the case where only a signal of the third band, out of a signal of the first frequency band group and a signal of the second frequency band group, is transferred, the terminal 35a and the terminal 35d may be connected, and the terminal 36a and the terminal 36c may be disconnected. In the case where simultaneous transfer of a signal of the first band and a signal of the third band is performed, the terminal 35a or 35b and the terminal 35c may be connected, the terminal 35a or 35b and the terminal 35d may be connected, the terminal 36a and the terminal 36b may be disconnected, and the terminal 36a and the terminal 36c may be disconnected.

Accordingly, in the case where only a signal of the third band is transferred, since there is no need to take into consideration interference between the signal of the third band and a signal of the second band, the signal of the third band does not need to pass through the diplexer 10. Thus, transfer loss of the signal of the third band can be reduced by at least the amount of insertion loss of the filter 11.

Furthermore, for example, the high frequency circuit 1A may further include the switch 37 that includes the terminals 37a and 37b. The switch 35 may further include the terminal 35f. The terminal 10c may be connected to the terminal 37a. The terminal 35f may be connected to the terminal 37b.

Accordingly, in the case where independent transfer of a signal of the second frequency band group is performed, by not causing the signal to pass through the diplexer 10, transfer loss of the signal can be reduced.

Furthermore, for example, in the high frequency circuit 1A, in the case where only a signal of the second band, out of a signal of the first frequency band group and a signal of the second frequency band group, is transferred, the terminal 35a or 35b and the terminal 35f may be connected, and the terminal 37a and the terminal 37b may be disconnected.

Accordingly, in the case where only a signal of the second band is transferred, since there is no need to take into consideration interference between the signal of the second band and a signal of the first frequency band group, the signal of the second band does not need to pass through the diplexer 10. Thus, transfer loss of the signal of the second band can be reduced by at least the amount of insertion loss of the filter 12.

Furthermore, for example, the high frequency circuit 1B may further include the diplexer 16 that includes the terminals 16a, 16b, and 16c and the filters 17 and 18 and, the switch 62 that includes the terminals 62a, 62b, and 62c, in addition to the antenna terminals 101 and 102, the switch 61, the switch 63 including the terminals 63a, 63b, and 63c, and the diplexer 13 including the filters 14 and 15. The switch 61 may further include the terminal 61h, in addition to the terminals 61a to 61g. The filter 14 may be connected between the terminals 13a and 13b and have a pass band including the first frequency band group but not including the second frequency band group. The filter 15 may be connected between the terminals 13a and 13c and have a pass band including a fourth band belonging to the second frequency band group but not including the first frequency band group. The filter 17 may be connected between the terminals 16a and 16b and have a pass band including the first frequency band group but not including the second frequency band group. The filter 18 may be connected between the terminals 16a and 16c and have a pass band including a fifth band that belongs to the second frequency band group and is higher than the fourth band but not including the first frequency band group. The terminal 61h may be connected to the terminal 16a. The terminal 62a may be connected to the terminal 16b. The terminals 61c, 63b, and 62b may be connected to one terminal of the first filter. The terminals 61d, 63c, and 62c may be connected to one terminal of the fourth filter. The high frequency circuit 1B may further include the high pass filter 28 that is connected to the terminal 13c, uses the fourth band as a pass band, and uses the fifth band as an attenuation band and the low pass filter 29 that is connected to the terminal 16c, uses the fifth band as a pass band, and uses the fourth band as an attenuation band.

Accordingly, in the case where simultaneous transfer of a signal of the first frequency band group and a signal of the second frequency band group is performed, by causing both the signals to pass through the diplexer 13 or 16, isolation between the signals can be ensured. Furthermore, in the case where independent transfer of a signal of the first frequency band group is performed, by not causing the signal to pass through the diplexer 13 or 16, transfer loss of the signal can be reduced. That is, the high frequency circuit 1B supporting multiple bands and capable of transferring a signal in the single mode with low loss can be provided.

Furthermore, for example, in the high frequency circuit 1B, in the case where simultaneous transfer of a signal of the first band and a signal of the fourth band is performed, the terminal 61a and the terminal 61g may be connected, and the terminal 62a and the terminal 63b may be connected. In the case where simultaneous transfer of a signal of the first band and a signal of the fifth band is performed, the terminal 61a and the terminal 61h may be connected, and the terminal 62a and the terminal 62b may be connected. In the case where only a signal of the first band, out of a signal of the first frequency band group and a signal of the second frequency band group, is transferred, the terminal 61a and the terminal 61c may be connected, the terminal 63a and the terminal 63b may be disconnected, and the terminal 62a and the terminal 62b may be disconnected. In the case where only a signal of the third band, out of a signal of the first frequency band group and a signal of the second frequency band group, is transferred, the terminal 61a and the terminal 61d may be connected, the terminal 63a and the terminal 63c may be disconnected, and the terminal 62a and the terminal 62c may be disconnected. In the case where simultaneous transfer of a signal of the first band and a signal of the third band is performed, the terminal 61a or 61b and the terminal 61c may be connected, the terminal 61a or 61b and the terminal 61d may be connected, the terminal 63a and the terminal 63b may be disconnected, the terminal 63a and the terminal 63c may be disconnected, the terminal 62a and the terminal 62b may be disconnected, and the terminal 62a and the terminal 62c may be disconnected.

Accordingly, in the case where simultaneous transfer of a signal of the first band and a signal of the fourth band is performed and in the case where simultaneous transfer of a signal of the first band and a signal of the fifth band is performed, since both the signal of the first band and the signal of the fourth band or the fifth band pass through the diplexer 13 or 16, isolation between the two transmission signals is improved, thus suppressing mutual interference. Furthermore, in the case where only a signal of the first band is transferred, in the case where only a signal of the third band is transferred, and in the case where simultaneous transfer of a signal of the first band and a signal of the third band is performed, since there is no need to take into consideration interference between the signals of the first band and the third band and a signal of the second frequency band group, the signals of the first band and the third band do not need to pass through the diplexer 13 or 16. Thus, transfer loss of the signals of the first band and the third band can be reduced by at least the amount of insertion loss of the filter 14 or 17.

Furthermore, for example, in the high frequency circuit 1B, the fourth band may be band n77 for 5G-NR, and the fifth band may be band n79 for 5G-NR.

Furthermore, the communication apparatus 5 according to an embodiment includes the RFIC 3 that processes a high frequency signal and the high frequency circuit 1 that transfers a high frequency signal between the RFIC 3 and the antenna 2.

Accordingly, effects of the high frequency circuit 1 can be implemented by the communication apparatus 5.

Other Embodiments

A high frequency circuit and a communication apparatus according to the present disclosure have been described above based on embodiments and modifications. However, the high frequency circuit and the communication apparatus according to the present disclosure are not limited to the embodiments and the modifications described above. Other embodiments implemented by combining component elements in the embodiments and the modifications described above, modifications obtained by making various changes conceived by those skilled in the art to the embodiments and the modifications described above without departing from the spirit of the present disclosure, and various types of equipment including the high frequency circuit and the communication apparatus are also included in the present disclosure.

In the circuit configurations of the high frequency circuit and the communication apparatus according to the embodiments described above, other circuit elements, wires, and other elements may be inserted between circuit elements and paths connecting signal paths illustrated in the drawings. For example, in the high frequency circuit 1 illustrated in FIG. 1, an impedance matching element may be inserted between the switch 31 and the filter 21, between the switch 31 and the diplexer 10, between the switch 33 and the power amplifier 41, between the switch 33 and the low noise amplifier 51, between the switch 34 and the power amplifier 42, and between the switch 34 and the low noise amplifier 52.

The present disclosure can be widely used as a high frequency circuit disposed in a front end part for a communication apparatus such as a mobile phone.

1, 1A, 1B, 500, 600 high frequency circuit 2, 2a, 2b antenna
3 RF signal processing circuit (RFIC)
4 baseband signal processing circuit (BBIC)
5, 5A, 5B communication apparatus
10, 13, 16 diplexer
10a, 10b, 10c, 13a, 13b, 13c, 16a, 16b, 16c, 31a, 31b, 31c, 32a, 32b, 35a, 35b, 35c, 35d, 35e, 35f, 36a, 36b, 36c, 37a, 37b, 61a, 61b, 61c, 61d, 61e, 61f, 61g, 61h, 62a, 62b, 62c, 62d, 62e, 63a, 63b, 63c, 63d, 63e terminal
11, 12, 14, 15, 17, 18, 21, 27 filter
22, 23, 24, 25, 26 duplexer
22R, 23R reception filter
22T, 23T transmission filter
28 high pass filter
29 low pass filter
31, 32, 33, 34, 35, 36, 37, 38, 39, 61, 62, 63, 64, 65, 66, 67, 68, 69, 70 switch
41, 42, 43, 44, 45, 46 power amplifier
51, 52 low noise amplifier
71, 72 band pass filter
100, 101, 102 antenna terminal
110, 111, 112, 130, 131, 132 transmission input terminal
120, 121, 122, 123, 140, 141, 142 reception output terminal

The invention claimed is:

1. A high frequency circuit comprising:
a first antenna terminal;
a first switch circuit that comprises a first terminal, a second terminal, and a third terminal;
a second switch circuit that comprises a fourth terminal and a fifth terminal;
a first filter that has a pass band comprising a first band; and
a first multiplexer that comprises a first common terminal, a sixth terminal, and a seventh terminal,
wherein the first multiplexer comprises:
  a second filter that is connected between the first common terminal and the sixth terminal, and that has a pass band comprising a first frequency band group but not a second frequency band group, the first frequency band group comprising the first band, and
  a third filter that is connected between the first common terminal and the seventh terminal, and that has a pass band comprising the second frequency band group but not the first frequency band group, and
wherein the first terminal is connected to the first antenna terminal, the second terminal and the fourth terminal are connected to one terminal of the first filter, the third terminal is connected to the first common terminal, and the fifth terminal is connected to the sixth terminal.

2. The high frequency circuit according to claim 1,
wherein during simultaneous transfer of a signal of the first band and a signal of a second band belonging to the second frequency band group, the first terminal and the third terminal are connected, and the fourth terminal and the fifth terminal are connected, and
wherein during transfer of only a signal of the first frequency band group, out of the signal of the first frequency band group and a signal of the second frequency band group, the first terminal and the second terminal are connected, and the fourth terminal and the fifth terminal are disconnected.

3. The high frequency circuit according to claim 1,
wherein the first frequency band group comprises frequencies of 3 GHz or less, and
wherein the second frequency band group comprises frequencies of 3 GHz or more.

4. The high frequency circuit according to claim 1,
wherein the first band is a band to which frequency division duplex (FDD) is applied, and
wherein a second band belonging to the second frequency band group is a band to which time division duplex (TDD) is applied.

5. The high frequency circuit according to claim 1, further comprising:
a second antenna terminal; and
a fourth filter that has a pass band comprising a third band belonging to the first frequency band group,
wherein the first switch circuit further comprises an eighth terminal and a ninth terminal,
wherein the second switch circuit further comprises a tenth terminal,
wherein the eighth terminal is connected to the second antenna terminal, and
wherein the ninth terminal and the tenth terminal are connected to one terminal of the fourth filter.

6. The high frequency circuit according to claim 5,
wherein during simultaneous transfer of a signal of the first band and a signal of a second band belonging to the second frequency band group, the first terminal and the third terminal are connected, and the fourth terminal and the fifth terminal are connected,
wherein during simultaneous transfer of a signal of the third band and the signal of the second band, the first terminal and the third terminal are connected, and the tenth terminal and the fifth terminal are connected,
wherein during transfer of only the signal of the first band, out of a signal of the first frequency band group and a signal of the second frequency band group, the first terminal and the second terminal are connected, and the fourth terminal and the fifth terminal are disconnected,
wherein during transfer of only the signal of the third band, out of the signal of the first frequency band group and the signal of the second frequency band group, the first terminal and the ninth terminal are connected, and the tenth terminal and the fifth terminal are disconnected, and
wherein during simultaneous transfer of the signal of the first band and the signal of the third band, the first terminal or the eighth terminal and the second terminal are connected, the first terminal or the eighth terminal and the ninth terminal are connected, the fourth terminal and the fifth terminal are disconnected, and the tenth terminal and the fifth terminal are disconnected.

7. The high frequency circuit according to claim 5, further comprising:
a third switch circuit that comprises an eleventh terminal and a twelfth terminal,
wherein the first switch circuit further comprises a thirteenth terminal, and
wherein the seventh terminal is connected to the twelfth terminal, and the thirteenth terminal is connected to the eleventh terminal.

8. The high frequency circuit according to claim 7,
wherein during transfer of only a signal of a second band belonging to the second frequency band group, out of a signal of the first frequency band group and a signal of the second frequency band group, the first terminal or the eighth terminal and the thirteenth terminal are connected, and the eleventh terminal and the twelfth terminal are disconnected.

9. The high frequency circuit according to claim 5, further comprising:

a second multiplexer that comprises a second common terminal, a fourteenth terminal, and a fifteenth terminal; and a fourth switch circuit that comprises a sixteenth terminal, a seventeenth terminal, and an eighteenth terminal, wherein the first switch circuit further comprises a nineteenth terminal, wherein the second filter is connected between the first common terminal and the sixth terminal, and has a pass band comprising the first frequency band group but not the second frequency band group, wherein the third filter is connected between the first common terminal and the seventh terminal, and has a pass band comprising a fourth band belonging to the second frequency band group but not the first frequency band group, wherein the second multiplexer comprises:

a fifth filter that is connected between the second common terminal and the fourteenth terminal, and has a pass band comprising the first frequency band group but not the second frequency band group, and a sixth filter that is connected between the second common terminal and the fifteenth terminal, and that has a pass band comprising a fifth band that belongs to the second frequency band group and is higher in frequency than the fourth band, the pass band of the sixth filter not comprising the first frequency band group, wherein the nineteenth terminal is connected to the second common terminal, and the sixteenth terminal is connected to the fourteenth terminal, wherein the second terminal, the fourth terminal, and the seventeenth terminal are connected to the one terminal of the first filter, wherein the ninth terminal, the tenth terminal, and the eighteenth terminal are connected to the one terminal of the fourth filter, and wherein the high frequency circuit further comprises:

a low pass filter that is connected to the seventh terminal, that has a pass band comprising the fourth band, and that has an attenuation band comprising the fifth band, and a high pass filter that is connected to the fifteenth terminal, that has a pass band comprising the fifth band, and that has an attenuation band that comprises the fourth band.

10. The high frequency circuit according to claim 9, wherein during simultaneous transfer of a signal of the first band and a signal of the fourth band, the first terminal and the third terminal are connected, and the fourth terminal and the fifth terminal are connected, wherein during simultaneous transfer of the signal of the first band and a signal of the fifth band, the first terminal and the nineteenth terminal are connected, and the sixteenth terminal and the seventeenth terminal are connected, wherein during transfer of only the signal of the first band, out of a signal of the first frequency band group and a signal of the second frequency band group, the first terminal and the second terminal are connected, the fourth terminal and the fifth terminal are disconnected, and the sixteenth terminal and the seventeenth terminal are disconnected, wherein during transfer of only a signal of the third band, out of the signal of the first frequency band group and the signal of the second frequency band group, the first terminal and the ninth terminal are connected, the tenth terminal and the fifth terminal are disconnected, and the sixteenth terminal and the eighteenth terminal are disconnected, and wherein during simultaneous transfer of the signal of the first band and the signal of the third band, the first terminal or the eighth terminal and the second terminal are connected, the first terminal or the eighth terminal and the ninth terminal are connected, the fourth terminal and the fifth terminal are disconnected, the tenth terminal and the fifth terminal are disconnected, the sixteenth terminal and the seventeenth terminal are disconnected, and the sixteenth terminal and the eighteenth terminal are disconnected.

11. The high frequency circuit according to claim 9, wherein the fourth band is band n77 for 5th Generation New Radio (5G-NR), and wherein the fifth band is band n79 for 5G-NR.

12. A communication apparatus comprising:

a signal processing circuit configured to process a high frequency signal; and the high frequency circuit according to claim 1 that transfers the high frequency signal between the signal processing circuit and an antenna.

* * * * *